(12) United States Patent
Tanaka

(10) Patent No.: US 12,216,137 B2
(45) Date of Patent: Feb. 4, 2025

(54) PHYSICAL QUANTITY SENSOR AND INERTIAL MEASUREMENT UNIT

(71) Applicant: SEIKO EPSON CORPORATION, Tokyo (JP)

(72) Inventor: Satoru Tanaka, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/975,730

(22) Filed: Oct. 28, 2022

(65) Prior Publication Data

US 2023/0138452 A1  May 4, 2023

(30) Foreign Application Priority Data

Oct. 29, 2021 (JP) ................................. 2021-177282

(51) Int. Cl.
*G01P 15/125* (2006.01)
*G01P 15/18* (2013.01)

(52) U.S. Cl.
CPC ............ *G01P 15/125* (2013.01); *G01P 15/18* (2013.01)

(58) Field of Classification Search
CPC .... G01P 15/125; G01P 15/0802; G01P 15/18; G01P 15/14; G01P 2015/0831; G01P 2015/0862; G01C 21/16; G01C 21/166; G01C 21/18
See application file for complete search history.

(56) References Cited

U.S. PATENT DOCUMENTS

| | | | | |
|---|---|---|---|---|
| 2004/0231421 A1* | 11/2004 | Yoshioka | ............ | G01P 15/0802 73/514.32 |
| 2010/0024552 A1* | 2/2010 | Foster | ................... | G01P 15/131 73/514.32 |
| 2010/0117167 A1* | 5/2010 | Yokura | ................... | G01P 1/023 257/415 |
| 2013/0256814 A1* | 10/2013 | Tanaka | ................... | B81B 7/0006 257/415 |
| 2017/0363655 A1* | 12/2017 | Zhang | ................... | G01P 15/125 |

(Continued)

FOREIGN PATENT DOCUMENTS

JP  2004-276201    * 10/2004
JP  2021-032820 A    3/2021

*Primary Examiner* — Helen C Kwok
(74) *Attorney, Agent, or Firm* — Harness, Dickey & Pierce, P.L.C.

(57) ABSTRACT

A physical quantity sensor includes: a first fixed electrode portion; a first movable electrode portion; a first fixed portion fixed to a substrate; a first support beam having one end coupled to the first fixed portion; a second support beam having one end coupled to the first fixed portion; and a first coupling portion coupling the other end of the first support beam and the other end of the second support beam to the first movable electrode portion. In a plan view in a third direction orthogonal to the substrate, the first movable electrode portion and the first fixed portion are disposed along a first direction, the first support beam and the second support beam are disposed along a second direction, and the first coupling portion includes a first portion disposed along the second direction side by side with the first support beam and the second support beam, and a second portion coupled to the first portion and the first movable electrode portion and disposed along the first direction.

13 Claims, 21 Drawing Sheets

(56) References Cited

U.S. PATENT DOCUMENTS

| | | | |
|---|---|---|---|
| 2018/0031601 A1* | 2/2018 | Anac | G01C 19/5726 |
| 2018/0031603 A1* | 2/2018 | Huang | G01P 15/097 |
| 2019/0049483 A1* | 2/2019 | Matsuzawa | G01C 21/166 |
| 2020/0166539 A1* | 5/2020 | Furuhata | G01C 19/5747 |
| 2021/0063432 A1 | 3/2021 | Fujimoto et al. | |

* cited by examiner

FIG. 7
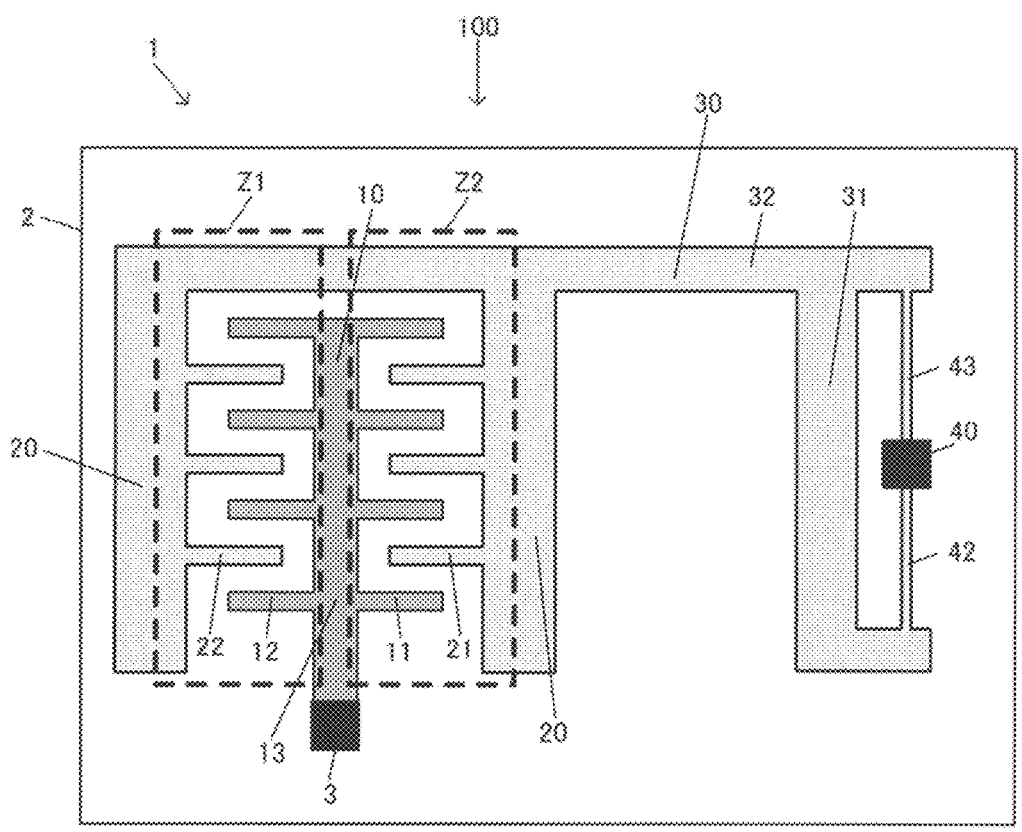
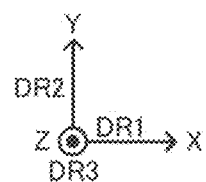

FIG. 10
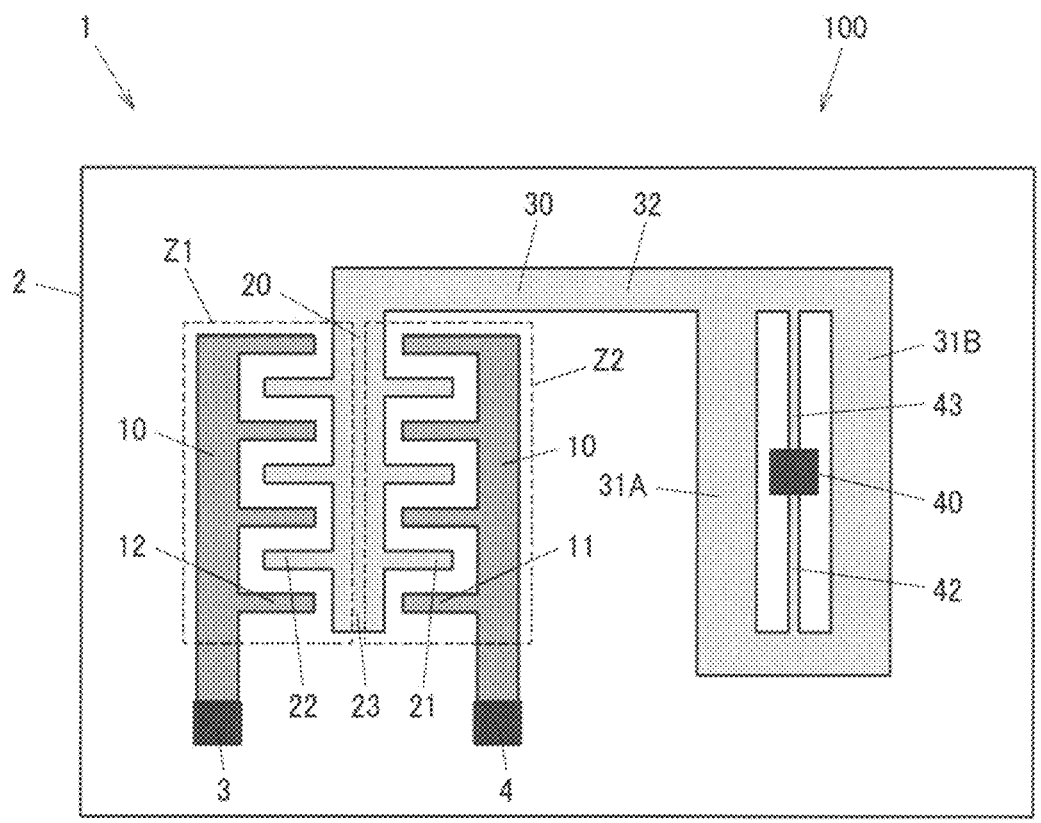

PHYSICAL QUANTITY SENSOR AND INERTIAL MEASUREMENT UNIT

The present application is based on, and claims priority from JP Application Serial Number 2021-177282, filed Oct. 29, 2021, the disclosure of which is hereby incorporated by reference herein in its entirety.

BACKGROUND

1. Technical Field

The present disclosure relates to a physical quantity sensor, an inertial measurement unit, and the like.

2. Related Art

In the related art, a physical quantity sensor that detects a physical quantity such as acceleration is known. As such a physical quantity sensor, for example, a sensor disclosed in JP-A-2021-032820 is known. JP-A-2021-032820 discloses a physical quantity sensor including two inertial sensors each including a fixed electrode and a movable electrode.

The physical quantity sensor disclosed in JP-A-2021-032820 includes a plurality of inertial sensors in order to detect a physical quantity with high sensitivity. However, when the plurality of inertial sensors are juxtaposed in a Y direction in the physical quantity sensor, a dead space is likely to be formed, and it is difficult to miniaturize the physical quantity sensor.

SUMMARY

An aspect of the present disclosure relates to a physical quantity sensor including: a first fixed electrode portion provided at a substrate; a first movable electrode portion provided such that a movable electrode faces a fixed electrode of the first fixed electrode portion; at least one first fixed portion fixed to the substrate; a first support beam having one end coupled to the first fixed portion; a second support beam having one end coupled to the first fixed portion; and a first coupling portion coupling the other end of the first support beam and the other end of the second support beam to the first movable electrode portion, in which when three directions orthogonal to one another are defined as a first direction, a second direction, and a third direction, in a plan view in the third direction orthogonal to the substrate, the first movable electrode portion and the first fixed portion are disposed along the first direction, the first support beam and the second support beam are disposed along the second direction, and the first coupling portion includes a first portion disposed along the second direction side by side with the first support beam and the second support beam, and a second portion coupled to the first portion and the first movable electrode portion and disposed along the first direction.

Another aspect of the present disclosure relates to an inertial measurement unit including the physical quantity sensor described above and a control unit that performs control based on a detection signal output from the physical quantity sensor.

BRIEF DESCRIPTION OF THE DRAWINGS

FIG. 7 is a plan view showing another configuration example of the physical quantity sensor.

FIG. 10 is a plan view showing another configuration example of the physical quantity sensor.

DESCRIPTION OF EXEMPLARY EMBODIMENTS

Hereinafter, the present embodiment will be described. The present embodiment to be described below does not unduly limit contents described in the claims. Not all configurations described in the present embodiment are necessarily essential constituent elements.

1. Physical Quantity Sensor

Figure 1:
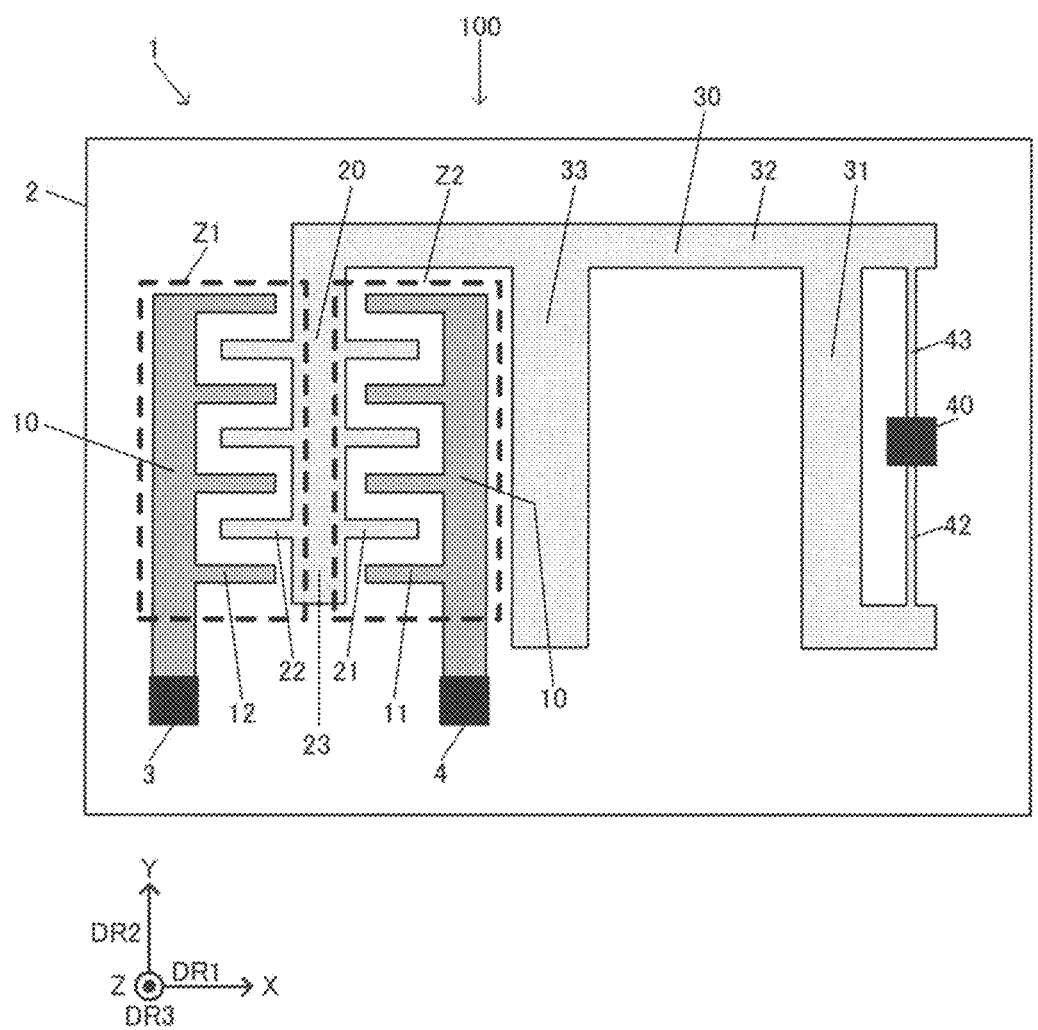
FIG. 1 is a configuration example of a physical quantity sensor according to the present embodiment.

A configuration example of a physical quantity sensor 1 according to the present embodiment will be described with reference to FIG. 1 by taking an acceleration sensor that detects acceleration in a vertical direction as an example. FIG. 1 is a plan view of the physical quantity sensor 1 when viewed in a direction orthogonal to a substrate 2. The physical quantity sensor 1 is a micro electro mechanical systems (MEMS) device, and is, for example, an inertial sensor.

In FIG. 1, and FIGS. 2 to 4 and 6 to 19 to be described later, for convenience of description, dimensions of members, an interval between the members, and the like are schematically illustrated, and not all constituent elements are illustrated. For example, electrode wiring and an electrode terminal are not illustrated. In the following description, a case where a physical quantity detected by the physical quantity sensor 1 is acceleration will be mainly described as an example, and the physical quantity is not limited to the acceleration, and may be another physical quantity such as a velocity, pressure, displacement, an angular velocity, or gravity. The physical quantity sensor 1 may be used as a pressure sensor, an MEMS switch, or the like. In FIG. 1, directions orthogonal to one another are defined as a first direction DR1, a second direction DR2, and a third direction DR3. The first direction DR1, the second direction DR2, and the third direction DR3 are, for example, an X-axis direction, a Y-axis direction, and a Z-axis direction, respectively, and are not limited thereto. For example, the third direction DR3 corresponding to the Z-axis direction is, for example, a direction orthogonal to the substrate 2 of the physical quantity sensor 1, and is, for example, a vertical direction. The first direction DR1 corresponding to the X-axis direction and the second direction DR2 corresponding to the Y-axis direction are directions orthogonal to the third direction DR3, and an XY plane which is a plane along the first direction DR1 and the second direction DR2 is, for example, along a horizontal plane. The term "orthogonal" includes not only a case of crossing at 90° but also a case of crossing at an angle slightly inclined from 90°.

The substrate 2 is, for example, a silicon substrate made of semiconductor silicon or a glass substrate made of a glass material such as borosilicate glass. However, a constituent material for the substrate 2 is not particularly limited, and a quartz substrate, a silicon on insulator (SOI) substrate, or the like may be used.

Further, as shown in FIG. 1, the physical quantity sensor 1 according to the present embodiment includes first fixed electrode portions 10, a first movable electrode portion 20, a first coupling portion 30, a first fixed portion 40, a first support beam 42, and a second support beam 43.

These first fixed electrode portions 10, the first movable electrode portion 20, the first coupling portion 30, the first fixed portion 40, the first support beam 42, and the second support beam 43 constitute a first detection element 100 of the physical quantity sensor 1. The first detection element 100 detects, for example, acceleration in the third direction DR3 which is the Z-axis direction, in a detection portion Z1 and a detection portion Z2.

The first fixed electrode portions 10 are provided at the substrate 2. Specifically, the first fixed electrode portions 10 are fixed to the substrate 2 by fixed portions 3 and 4, respectively. The first fixed electrode portions 10 include a plurality of fixed electrodes. The plurality of fixed electrodes extend, for example, along the first direction DR1 which is the X-axis direction. For example, the first fixed electrode portions 10 are first fixed electrode groups.

The first movable electrode portion 20 is provided such that a movable electrode faces the fixed electrode of the first fixed electrode portions 10. The first movable electrode portion 20 includes the plurality of movable electrodes. The plurality of movable electrodes extend, for example, along the first direction DR1 which is the X-axis direction. For example, the first movable electrode portion 20 is a first movable electrode group. Specifically, a first movable electrode 21 and a second movable electrode 22 of the first movable electrode portion 20 respectively face a first fixed movable electrode 11 and a second fixed electrode 12 of the first fixed electrode portions 10 in the second direction DR2 which is the Y-axis direction.

For example, in FIG. 1, the first movable electrode portion 20 is a comb teeth-shaped movable electrode group in which the plurality of movable electrodes are arranged in a comb teeth shape in a plan view in the third direction DR3, and the first fixed electrode portions 10 are the comb teeth-shaped fixed electrode groups in which the plurality of fixed electrodes are arranged in a comb teeth shape in the plan view in the third direction DR3.

In the detection portions Z1 and Z2 of the first detection element 100, the movable electrodes of the comb teeth-shaped movable electrode group of the first movable electrode portion 20 and the fixed electrodes of the comb teeth-shaped fixed electrode groups of the first fixed electrode portions 10 are arranged in a manner of alternately facing one another.

The first fixed portion 40 is fixed to the substrate 2. Further, one end of the first support beam 42 is coupled to the first fixed portion 40, and one end of the second support beam 43 is also coupled to the first fixed portion 40. For example, the first support beam 42 and the second support beam 43 are torsion springs. In FIG. 1, two support beams along the second direction DR2, that is, the first support beam 42 extending from the first fixed portion 40 in a direction opposite the second direction DR2 and the second support beam 43 extending from the first fixed portion 40 in the second direction DR2, are provided.

The first fixed portion 40 is used as an anchor of a first movable body including the first movable electrode portion 20 and the first coupling portion 30. Further, the first movable body including the first movable electrode portion 20 swings about a rotation shaft along the second direction DR2 with the first fixed portion 40 as a fulcrum. For example, the first movable body swings around the rotation shaft while twisting and deforming the first support beam 42 and the second support beam 43 with the first support beam 42 and the second support beam 43 along the second direction DR2 as the rotation shaft. Accordingly, the first detection element 100 having a one-sided seesaw structure is achieved.

The first coupling portion 30 includes a first portion 31 disposed along the second direction DR2 side by side with the first support beam 42 and the second support beam 43, and a second portion 32 coupled to the first portion 31 and the first movable electrode portion 20 and disposed along the first direction DR1. As described above, the one end of the first support beam 42 is coupled to the first fixed portion 40, and the one end of the second support beam 43 is also coupled to the first fixed portion 40. Further, the first portion 31 is coupled to the other end of the first support beam 42 which is not coupled to the first fixed portion 40 and the other end of the second support beam 43 which is not coupled to the first fixed portion 40. One end of the second portion 32 is coupled to the first portion 31, and the other end of the second portion 32 is coupled to the first movable electrode portion 20. The first portion 31 and the second portion 32 of the first coupling portion 30 contribute to an inertia moment I to be described later with reference to FIG. 5.

As described above, the physical quantity sensor 1 according to the present embodiment includes the first fixed electrode portions 10 provided at the substrate 2, the first movable electrode portion 20 provided such that the movable electrode faces the fixed electrode of the first fixed electrode portions 10, at least one first fixed portion 40 fixed to the substrate 2, the first support beam 42 having the one end coupled to the first fixed portion 40, the second support beam 43 having the one end coupled to the first fixed portion 40, and the first coupling portion 30 coupling the other end of the first support beam 42 and the other end of the second support beam 43 to the first movable electrode portion 20. Further, when the three directions orthogonal to one another are defined as the first direction DR1, the second direction DR2, and the third direction DR3 in the plan view in the third direction DR3 orthogonal to the substrate 2, the first movable electrode portion 20 and the first fixed portion 40 are disposed along the first direction DR1, and the first support beam 42 and the second support beam 43 are disposed along the second direction DR2. Further, the first coupling portion 30 includes the first portion 31 disposed along the second direction DR2 side by side with the first support beam 42 and the second support beam 43, and the second portion 32 coupled to the first portion 31 and the first movable electrode portion 20 and disposed along the first direction DR1.

Figure 2:
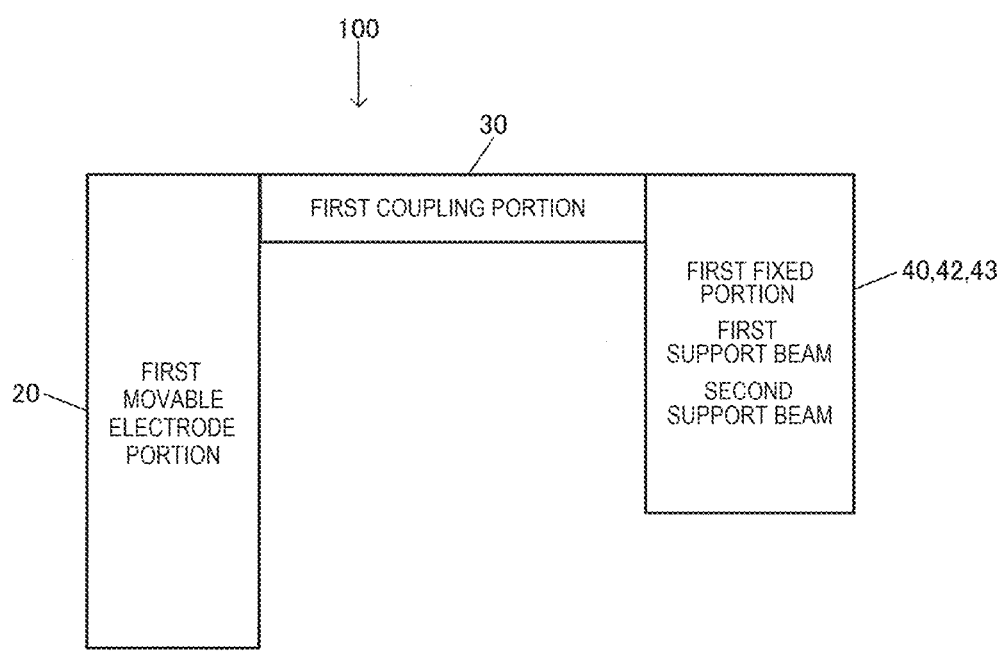
FIG. 2 is a diagram illustrating an arrangement of the physical quantity sensor.
Figure 3:
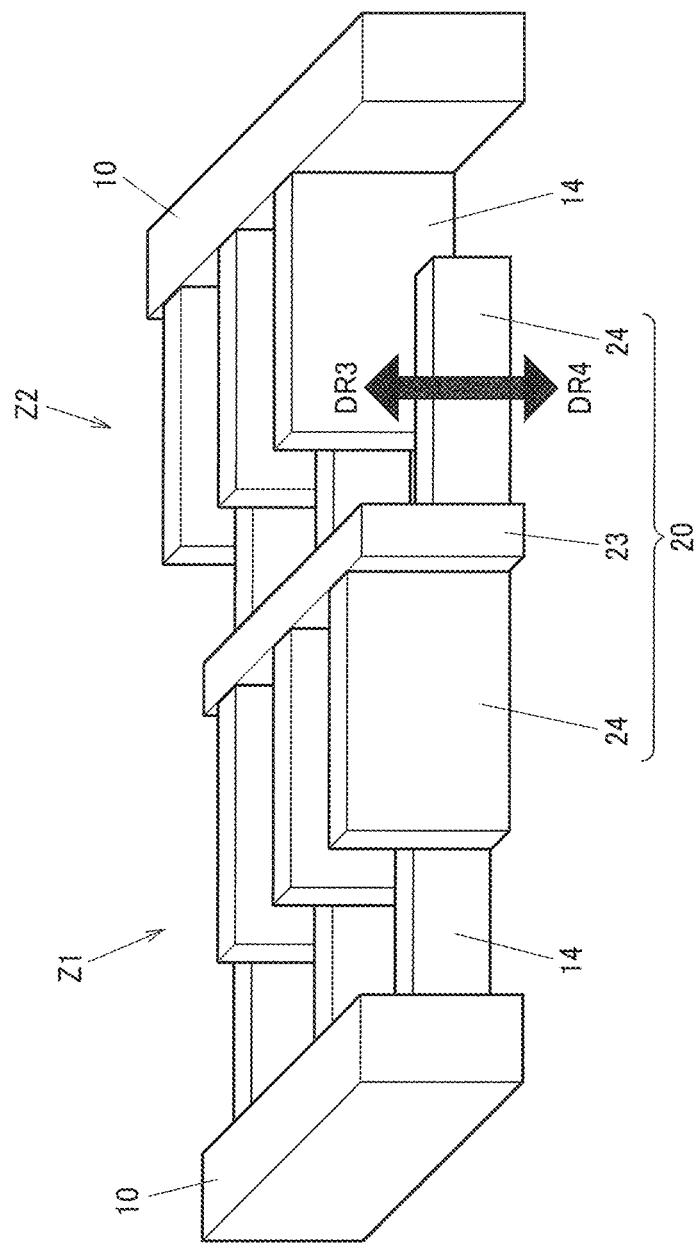
FIG. 3 is a view illustrating an operation of a detection portion.

FIG. 2 shows a state of the first detection element 100 of the physical quantity sensor 1 in which the first movable electrode portion 20, the first coupling portion 30, and the first fixed portion 40 are disposed in the first direction DR1 in an order of the first movable electrode portion 20, the first coupling portion 30, the first fixed portion 40, and the like in the plan view in the third direction DR3 orthogonal to the substrate 2. FIG. 3 is a view illustrating structures of the electrodes of the detection portions Z1 and Z2 of the first detection element 100. As shown in FIG. 3, the movable electrodes and the fixed electrodes of the detection portions Z1 and Z2 have different thicknesses in the third direction DR3. Specifically, as shown in FIG. 3, in the detection portion Z1, a thickness of a movable electrode 24 of the first movable electrode portion 20 in the third direction DR3 is larger than a thickness of a fixed electrode 14 of the first fixed electrode portion 10 in the third direction DR3. On the other hand, in the detection portion Z2, a thickness of the movable electrode 24 of the first movable electrode portion 20 in the third direction DR3 is smaller than a thickness of a fixed electrode 14 of the first fixed electrode portion 10 in the third direction DR3. Here, the movable electrodes 24 in FIG. 3 respectively correspond to the first movable electrode 21 and the second movable electrode 22 in FIG. 1, and the fixed electrodes 14 respectively correspond to the first fixed electrode 11 and the second fixed electrode 12.

Figure 4:
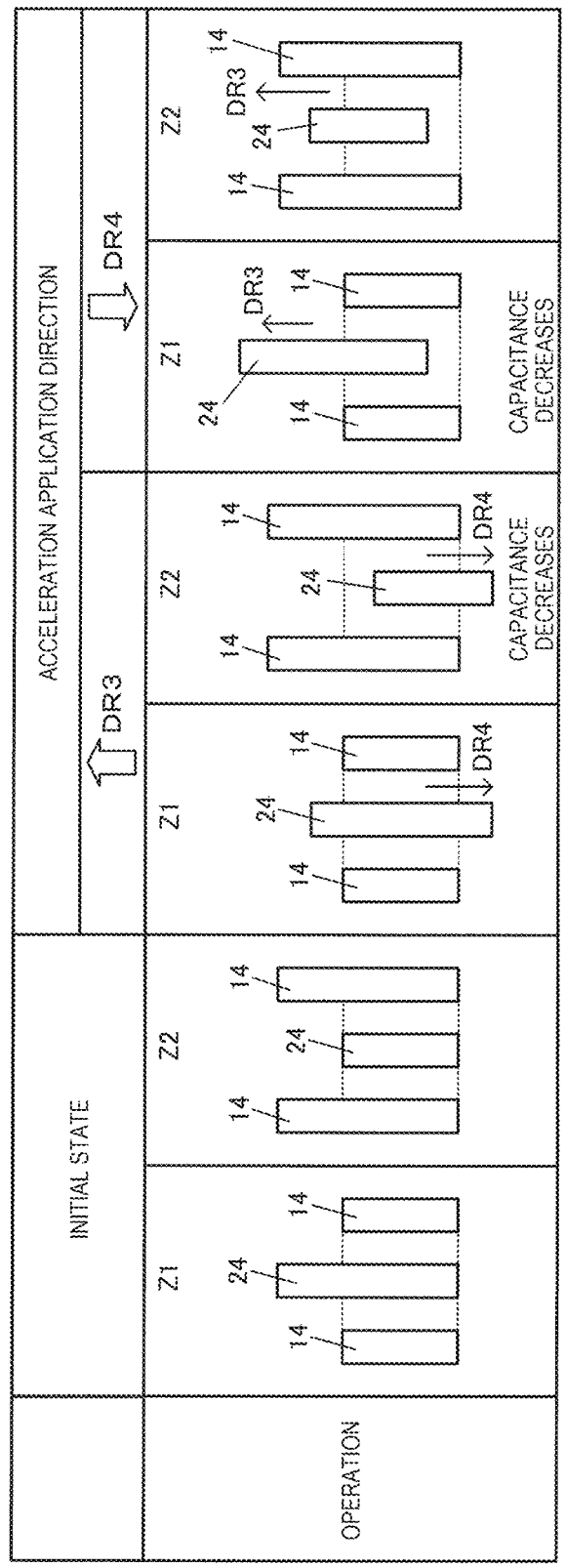
FIG. 4 is a diagram illustrating the operation of the detection portion.

FIG. 4 is a diagram illustrating operation of the detection portions Z1 and Z2 in the first detection element 100. In FIG. 4, in an initial state, the fixed electrodes 14 and the movable electrodes 24 are flush since positions of end portions of the movable electrodes 24 and the fixed electrodes 14 on a fourth direction DR4 side coincide in a side view of the detection portions Z1 and Z2 in the second direction DR2. Here, the initial state is a stationary state. A fourth direction DR4 is a direction opposite the third direction DR3, and is, for example, a direction on a negative side in the Z-axis direction.

When the acceleration in the third direction DR3 is generated from this initial state, the movable electrodes 24 in the detection portions Z1 and Z2 are displaced to the fourth direction DR4 side, which is the direction opposite the third direction DR3, as shown in FIG. 4. Accordingly, a facing area between the movable electrode 24 and the fixed electrode 14 is maintained in the detection portion Z1, and a facing area between the movable electrode 24 and the fixed electrode 14 decreases in the detection portion Z2. Therefore, the acceleration in the third direction DR3 can be detected by detecting a change in a capacitance due to the decrease in the facing area in the detection portion Z2.

On the other hand, when acceleration in the fourth direction DR4 is generated from the initial state, the movable electrodes 24 are displaced to the third direction DR3 in the detection portions Z1 and Z2, as shown in FIG. 4. Accordingly, the facing area between the movable electrode 24 and the fixed electrode 14 decreases in the detection portion Z1, and the facing area between the movable electrode 24 and the fixed electrode 14 is maintained in the detection portion Z2. Therefore, the acceleration in the fourth direction DR4 can be detected by detecting a change in a capacitance due to the decrease in the facing area in the detection portion Z1. Therefore, the acceleration in the third direction DR3 and the acceleration in the fourth direction DR4 can be detected by the detection portions Z1 and Z2. The detection of the change in the capacitance can be achieved by, for example, coupling the first fixed electrode portion 10 of the detection portion Z1 to a differential amplifier circuit QV via first fixed electrode wiring LF1A and a pad PF1A, coupling the first fixed electrode portion 10 of the detection portion Z2 to the differential amplifier circuit QV via first fixed electrode wiring LF1B and a pad PF1B, and coupling the first movable electrode portion 20 to the differential amplifier circuit QV via first movable electrode wiring LV and a pad PV.

In the above description, in the physical quantity sensor 1, the case where the detection portion Z1, the detection portion Z2, and the rotation shaft including the first fixed portion 40 and the like are arranged in an order of the detection portion Z1, the detection portion Z2, and the rotation shaft including the first fixed portion 40 and the like along the first direction DR1 has been described as an example. Here, the detection portion Z1 and the detection portion Z2 may be arranged side by side along the second direction DR2. That is, by changing the thicknesses of the fixed electrodes 14 and the movable electrodes 24 in the second direction DR2, the detection portion Z1 and the detection portion Z2 can also be arranged side by side along the second direction DR2.

As an acceleration sensor in the Z direction, for example, as described above, an acceleration sensor using a change in electric charge appearing in facing electrodes is known. For example, in an acceleration sensor in a Z direction disclosed in JP-A-2021-032820, when a force in the Z direction is applied, a movable electrode swings around a rotation shaft provided in a direction along a Y axis, and a facing area between an electrode plate of the movable electrode and an electrode plate of a fixed electrode changes, so that acceleration in the Z direction can be detected by detecting a change in electric charge.

Figure 5:
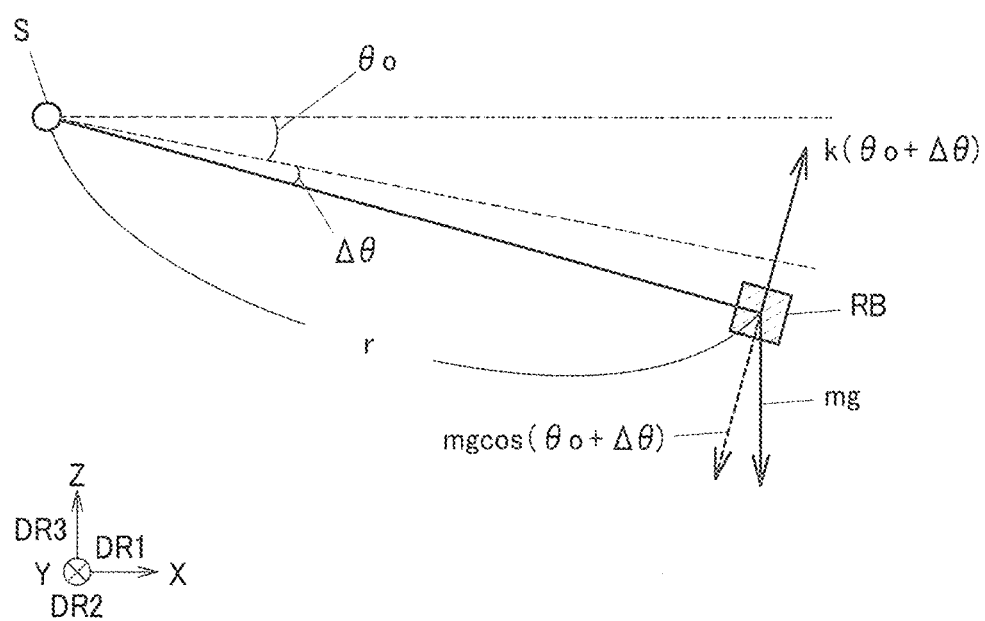
FIG. 5 is a view illustrating rotational motion.

As described above, the physical quantity sensor 1 according to the present embodiment detects the acceleration in the Z-axis direction by rotational motion of the first movable electrode portion 20 with the Y axis or the X axis as a rotation axis. Here, the rotational motion with the Y axis as the rotation axis will be considered. FIG. 5 shows a state in which a rigid body RB having a mass m is coupled to a torsion spring S disposed along the Y-axis direction via a rod having a length r. When the torsion spring S is twisted around the Y axis, the rigid body RB can move on a circular orbit in an XZ plane away from the torsion spring S by the length r.

In a rotational motion system shown in FIG. 5, an equation of motion in the initial state is represented by Formula (1), in which co (rad/sec) represents an angular velocity of the rotational motion about the Y axis, I (kg·m²) represents the inertia moment of the rigid body RB, T (N·m)

represents torque acting on the rigid body RB, and k (N) represents a spring constant of the torsion spring S. The inertia moment I is $mr^2$.

$$I\frac{d\omega}{dt} = mg\cos\theta_0 \cdot r - k\theta_0 \cdot r = 0 \quad (1)$$

That is, in the initial state, in a state where the rigid body RB is inclined by an angle $\theta_0$ from the X axis, torque of a gravity component and torque of a component of the torsion spring S are balanced and stationary. Further, when torque is applied to the rigid body RB in the stationary state, the equation of motion is represented by Formula (2).

$$I\frac{d\omega}{dt} = mg\cos(\theta_0 + \Delta\theta) \cdot r - k(\theta_0 + \Delta\theta) \cdot r \quad (2)$$

That is, when the rigid body RB receives the torque, the rigid body RB is inclined by $\Delta\theta$ from the stationary state and rotates at angular acceleration $d\omega/dt$. Here, when the angle $\Delta\theta$ is in a range near zero, $\cos(\theta_0+\Delta\theta)$ can be approximated to $\cos\theta_0 - \Delta\theta \sin\theta_0$, and Formula (2) is approximately expressed as Formula (3).

$$I\frac{d\omega}{dt} = (mg\sin\theta_0 + k)\Delta\theta \cdot r \quad (3)$$

When $\Delta\theta/(d\omega/dt)$ indicating sensitivity of angular acceleration is solved from Formula (3), the sensitivity of the angular acceleration is represented by Formula (4).

$$\frac{\Delta\theta}{\frac{d\omega}{dt}} = \frac{mr}{mg\sin\theta_0 + k} \quad (4)$$

From Formula (4), when the angle $\theta_0$ in the stationary state is small, the sensitivity of the angular acceleration is increased as the length r corresponding to a distance between the rotation shaft and the rigid body RB is increased, and the sensitivity of the angular acceleration is increased as the mass m of the rigid body RB is increased. Therefore, regarding sensitivity of the acceleration in the Z direction, the sensitivity of the acceleration in the Z-axis direction is improved as the mass m of an electrode at a tip of a seesaw is increased, and the sensitivity of the acceleration in the Z-axis direction is improved as a distance between the rotation shaft and the electrode or the like is increased.

In this regard, the physical quantity sensor in the Z-axis direction disclosed in JP-A-2021-032820 adopts a structure in which a sufficient distance from the rotation shaft of the movable electrode to a position where the fixed electrode and the movable electrode face each other is ensured. Therefore, from Formula (4) indicating the sensitivity of the acceleration in the Z direction described above, by adopting such a structure, the length r in Formula (4) can be increased, and the sensitivity of the acceleration in the Z-axis direction can be improved. By increasing the distance, a mass of a movable body including the movable electrode in the rotational motion system around the rotation shaft is also increased, and the sensitivity of the acceleration in the Z direction is improved. Furthermore, the sensitivity of the acceleration in the Z direction can also be improved by adopting a structure in which two detection portions each including one set of the movable electrode and the fixed electrode are provided in one physical quantity sensor, that is, a structure in which two one-sided seesaws are provided.

On the other hand, a dead space is increased by increasing the distance between the movable electrode and the rotation shaft or providing a plurality of detection elements in one physical quantity sensor. That is, by disposing the movable electrode at a distance from the rotation shaft, the detection sensitivity of the acceleration in the Z-axis direction is improved, an area from the rotation shaft to the movable electrode is increased, and a size of the acceleration sensor is increased. Although the sensitivity of the acceleration in the Z direction can be improved by providing two detection elements in one physical quantity sensor as in JP-A-2021-032820, since the detection elements are juxtaposed in an XY plane in JP-A-2021-032820, an arrangement area is increased as the number of the detection elements is increased, and a size of the physical quantity sensor is increased. As described above, both the improvement of the detection sensitivity of the acceleration of the physical quantity sensor and miniaturization cannot be achieved at the same time.

In the present embodiment shown in FIG. 1, a distance corresponding to the length r in the rotational motion system described with reference to FIG. 5 is a distance from the rotation shaft including the first fixed portion 40 to the first movable electrode portion 20. Therefore, as shown in the present embodiment, by providing the first coupling portion 30 with the first portion 31 and the second portion 32 and lengthening the second portion 32 in the first direction DR1, the length r in Formula (4) can be increased, and the detection sensitivity of the acceleration of the physical quantity sensor 1 can be improved.

Here, when the rotation shaft including the first support beam 42 and the second support beam 43 is coupled to the first movable electrode portion 20 via the second portion 32 of the first coupling portion 30, the mass m in the second portion 32 in Formula (4) is reduced as a width of the second portion 32 in the second direction DR2 is narrowed. Therefore, the sensitivity of the acceleration is reduced. However, since the second portion 32 is close to the rotation shaft and has a small length r in Formula (4), an influence on the rotational motion of the movable body including the first movable electrode portion 20 is small. Therefore, it is possible to ensure the effective length r of the movable body and improve the detection sensitivity of the physical quantity sensor 1 while preventing deterioration of the sensitivity of the acceleration due to a decrease of the mass m in the second portion 32.

Figure 6:
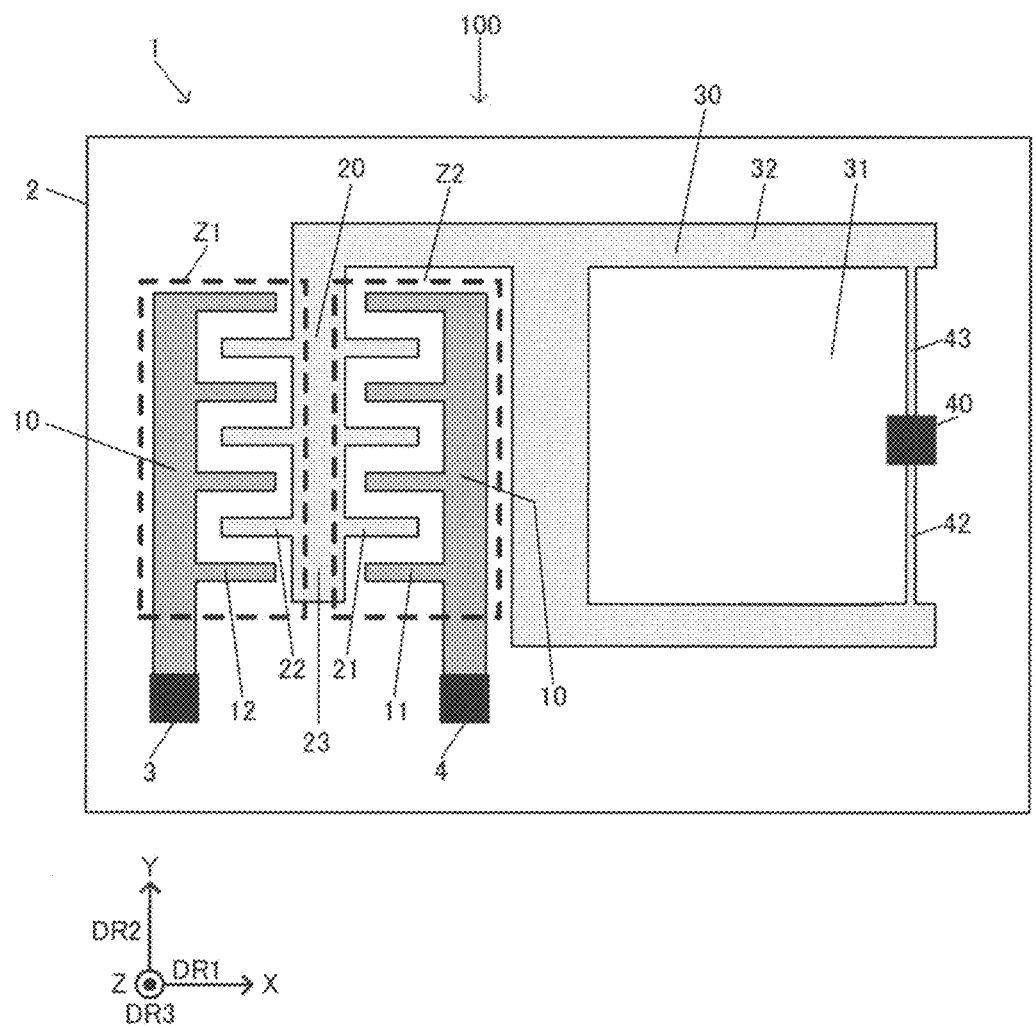
FIG. 6 is a view illustrating a comparative example of the physical quantity sensor according to the present embodiment.

From the viewpoint of the miniaturization of the physical quantity sensor 1, for example, the first coupling portion 30 may be configured as in a comparative example shown in FIG. 6. Even when the first coupling portion 30 is configured in this manner, by increasing the distance between the rotation shaft including the first fixed portion 40 and the first movable electrode portion 20 to provide an opening portion, formation of a dead space can be prevented, and both the improvement of the detection sensitivity of the acceleration of the physical quantity sensor 1 and the miniaturization can be achieved at the same time. However, in the comparative example, since the one end of the first support beam 42 and the one end of the second support beam 43 are coupled at a position separated from the rotation shaft including the first fixed portion 40, the rotation shaft is unstable, and detection accuracy of the acceleration in the third direction DR3 deteriorates.

Therefore, according to the present embodiment, since the first portion 31 disposed along the second direction DR2 side by side with the first support beam 42 and the second support beam 43 is provided in the first coupling portion 30, the end sides of the first support beam 42 and the second support beam 43 of which the other ends are coupled to the first fixed portion 40 can be coupled and held by the first portion 31 of the first coupling portion 30. Accordingly, swinging of the rotation shaft by the first support beam 42 and the second support beam 43 can be prevented by using rigidity of the first portion 31. Since the second portion 32 coupled to the first portion 31 and the first movable electrode portion 20 and disposed along the first direction DR1 is provided in the first coupling portion 30, the opening portion is formed in a region surrounded by the first portion 31 and the second portion 32, and a vacant space can be ensured. Accordingly, the miniaturization and the like of the physical quantity sensor 1 can be achieved by disposing other elements and the like in the vacant space. Even when such an opening portion is formed in the movable body including the first movable electrode portion 20, since a position of the opening portion is closer to the rotation shaft including the first support beam 42 and the second support beam 43 than the first movable electrode portion 20, a decrease in the sensitivity of the physical quantity sensor 1 can be prevented.

In the present embodiment, the first coupling portion 30 may include a third portion 33 coupled to the second portion 32 and disposed along the second direction DR2 side by side with the first movable electrode portion 20.

In this way, the third portion 33 of the first coupling portion 30 functioning as a mass portion can be provided at a position distant from the rotation shaft including the first support beam 42 and the second support beam 43. Therefore, a mass of the entire movable body including the first movable electrode portion 20 and a distance from the rotation shaft can be gained. Therefore, the mass m and the length r in Formula (4) indicating the sensitivity of the acceleration can be gained, and the detection sensitivity of the acceleration in the Z axis can be improved.

In the physical quantity sensor 1 according to the present embodiment, the fixed electrode 14 of the first fixed electrode portion 10 and the movable electrode 24 of the first movable electrode portion 20 can be provided in a manner of facing each other in the second direction DR2.

In this way, a voltage is applied between the fixed electrode 14 of the first fixed electrode portion 10 and the movable electrode 24 of the first movable electrode portion 20, which are provided in a manner of facing each other, whereby electric charge is accumulated in the facing portions of both of the electrodes. Further, when a force is applied in the direction along the Z direction, the first movable electrode portion 20 moves along the Z-axis direction, so that the facing area between both of the electrodes changes, and accordingly, an amount of the electric charge accumulated in both of the electrodes changes. By providing the fixed electrode 14 and the movable electrode 24 in a manner of facing each other in the second direction DR2, when the first movable electrode portion 20 rotates around the rotation shaft including the first support beam 42 and the second support beam 43, the fixed electrode 14 and the movable electrode 24 can move such that the facing area between both of the electrodes changes while maintaining a state in which the fixed electrode 14 and the movable electrode 24 face each other in parallel. Therefore, the acceleration in the third direction DR3 can be detected by the rotation of the movable body including the first movable electrode portion 20 and the like.

In the physical quantity sensor 1 according to the present embodiment, the first movable electrode portion 20 may include a first base movable electrode 23, the first movable electrode 21 extending from the first base movable electrode 23 in the first direction DR1, and the second movable electrode 22 extending from the first base movable electrode 23 in a direction opposite the first direction DR1, and the first fixed electrode portions 10 may include the first fixed electrode 11 facing the first movable electrode 21 and the second fixed electrode 12 facing the second movable electrode 22.

In FIG. 1, in the first movable electrode portion 20, the first movable electrode 21 and the second movable electrode 22 extend from the first base movable electrode 23 extending in a direction along the second direction DR2 to both sides along the first direction DR1. With such a structure, for example, when acceleration occurs in the first direction DR1 which is another axis direction, the facing area between the first fixed electrode 11 and the first movable electrode 21 decreases, while the facing area between the second fixed electrode 12 and the second movable electrode 22 increases. Therefore, with respect to the acceleration, the facing area between the first fixed electrode 11 and the first movable electrode 21 and the facing area between the second fixed electrode 12 and the second movable electrode 22 change in a manner of cancelling each other out. When the acceleration occurs in the direction opposite the first direction DR1, the facing area between the first fixed electrode 11 and the first movable electrode 21 increases, while the facing area between the second fixed electrode 12 and the second movable electrode 22 decreases. Therefore, with respect to the acceleration, the facing area between the first fixed electrode 11 and the first movable electrode 21 and the facing area between the second fixed electrode 12 and the second movable electrode 22 change in a manner of cancelling each other out. In this way, with respect to the acceleration in the direction along the first direction DR1, the change in the facing area between the fixed electrode 14 and the movable electrode 24 in the detection portion Z1 and the change in the facing area between the fixed electrode 14 and the movable electrode 24 in the detection portion Z2 cancel each other out. Therefore, the total facing area between the fixed electrodes 14 and the movable electrodes 24 does not change in the whole portion including the detection portions Z1 and Z2, and it is possible to prevent a situation where when acceleration in, for example, the first direction DR1 other than the third direction DR3 occurs, the acceleration in the first direction DR1 is erroneously detected as the acceleration in the third direction DR3. Therefore, deterioration of sensitivity of the physical quantity sensor 1 in another axis can be prevented.

FIG. 7 shows another configuration example of the physical quantity sensor 1 according to the present embodiment. The configuration example shown in FIG. 7 is different from the configuration example shown in FIG. 1 in shapes of the first fixed electrode portions 10 and the first movable electrode portion 20 and a positional relationship thereof. In the configuration example shown in FIG. 1, the first fixed electrode portions 10 and the first movable electrode portion 20 are provided in the order of the first fixed electrode portion 10, the first movable electrode portion 20, and the first fixed electrode portion 10 in the first direction DR1. On the other hand, in the configuration example shown in FIG.

7, the first fixed electrode portion 10 and the first movable electrode portion 20 are provided in an order of the first movable electrode portion 20, the first fixed electrode portion 10, and the first movable electrode portion 20 in the first direction DR1. That is, in the configuration example shown in FIG. 1, one first movable electrode portion 20 is provided between the two first fixed electrode portions 10, whereas in the configuration example shown in FIG. 7, one first fixed electrode portion 10 is provided between two portions that constitute one first movable electrode portion 20 and that are coupled on the second direction DR2 side. Therefore, regarding the fixed portions 3 and 4 that fix the first fixed electrode portions 10 to the substrate 2 in FIG. 1, the fixed portion 4 is not present in the configuration example shown in FIG. 7. In the configuration example shown in FIG. 7, the first movable electrode portion 20 is provided in a manner of surrounding the first fixed electrode portion 10. Further, the first movable electrode portion 20 on the first direction DR1 side is integrated with the third portion 33 of the first coupling portion 30. That is, in the physical quantity sensor 1 according to the present embodiment, the first fixed electrode portion 10 may include a first base fixed electrode 13, the first fixed electrode 11 extending from the first base fixed electrode 13 in the first direction DR1, and the second fixed electrode 12 extending from the first base fixed electrode 13 in the direction opposite the first direction DR1, and the first movable electrode portion 20 may include the first movable electrode 21 facing the first fixed electrode 11 and the second movable electrode 22 facing the second fixed electrode 12.

In this way, the first detection element 100 can be provided with the detection portion Z2 that includes the first fixed electrode 11 extending from the first base fixed electrode 13 in the first direction DR1 and the first movable electrode 21 facing the first fixed electrode 11 and that has a parallel plate capacitance, and the detection portion Z1 that includes the second fixed electrode 12 extending from the first base fixed electrode 13 in the direction opposite the first direction DR1 and the second movable electrode 22 facing the second fixed electrode 12 and that has a parallel plate capacitance. That is, the detection portions Z1 and Z2 can be configured by one first base fixed electrode 13 provided in the first fixed electrode portion 10. Therefore, similarly to the above, for example, when acceleration is applied in the first direction DR1, a capacitance between the first fixed electrode 11 and the first movable electrode 21 increases, while a capacitance between the second fixed electrode 12 and the second movable electrode 22 decreases. Therefore, since the capacitances of the detection portions Z1 and Z2 provided in one one-sided seesaw structure change in a manner of canceling each other out, the deterioration of the sensitivity in another axis can be prevented.

Figure 8:
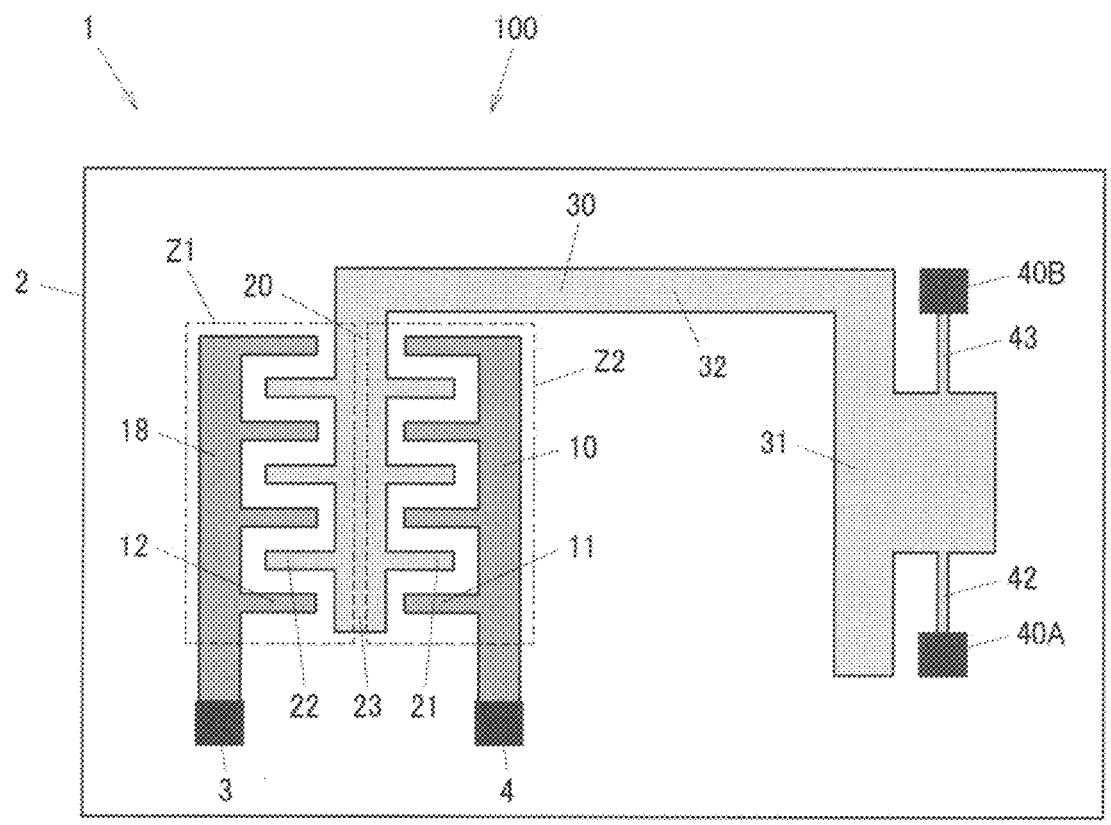
FIG. 8 is a plan view showing another configuration example of the physical quantity sensor.

FIG. 8 shows another configuration example according to the present embodiment. The configuration example shown in FIG. 8 is different from the configuration example shown in FIG. 1 in a configuration of the first fixed portion 40 and a shape of the first portion 31 of the first coupling portion 30. In the configuration example shown in FIG. 1, the first fixed portion 40 is a single fixed portion, whereas in the configuration example shown in FIG. 8, the first fixed portion 40 includes first fixed portions 40A and 40B. Specifically, one end of the movable body including the first movable electrode portion 20 and the first coupling portion 30 is fixed by the first fixed portions 40A and 40B provided in a direction along the second direction DR2. Further, one end of the first support beam 42 is coupled to the first fixed portion 40A, and one end of the second support beam 43 is coupled to the first fixed portion 40B. As described above, in the configuration example shown in FIG. 8, the movable body including the first movable electrode portion 20 and the first coupling portion 30 is fixed by the first fixed portions 40A and 40B. Therefore, the first portion 31 of the first coupling portion 30 couples, between the first fixed portion 40A and the first fixed portion 40B, the other end of the first support beam 42 which is not coupled to the first fixed portion 40A and the other end of the second support beam 43 which is not coupled to the first fixed portion 40B. That is, in the physical quantity sensor 1 according to the present embodiment, at least one first fixed portion 40 may include two fixed portions, the one end of the first support beam 42 may be coupled to one of the two fixed portions, and the one end of the second support beam 43 may be coupled to the other of the two fixed portions.

In this way, the movable body including the first movable electrode portion 20 and the first coupling portion 30 is fixed to the substrate 2 by the two fixed portions, that is, the first fixed portions 40A and 40B, and the first movable electrode portion 20 can swing around a rotation shaft along the second direction DR2.

In the configuration examples shown in FIGS. 1 and 7, since the first support beam 42 and the second support beam 43 serving as the rotation shaft of the movable body are fixed to the substrate 2 by one first fixed portion 40, the first support beam 42 and the second support beam 43 are in a state of being easily swung. On the other hand, in the configuration example shown in FIG. 8, the rotation shaft including the first support beam 42 and the second support beam 43 is fixed to the substrate 2 by the first fixed portion 40A and the first fixed portion 40B. With such a configuration, ease of the swinging around the rotation shaft including the first support beam 42 and the second support beam 43 does not change, but rigidity against wobbling with the second direction DR2 as a rotation axis is increased even in the same spring dimension. Therefore, when an impact is applied in the second direction DR2, the rotation shaft including the first support beam 42 and the second support beam 43 is less likely to be displaced, and thus impact resistance is improved. Therefore, the detection accuracy when the physical quantity sensor 1 detects the acceleration in the third direction DR3 can be improved.

Figure 9:
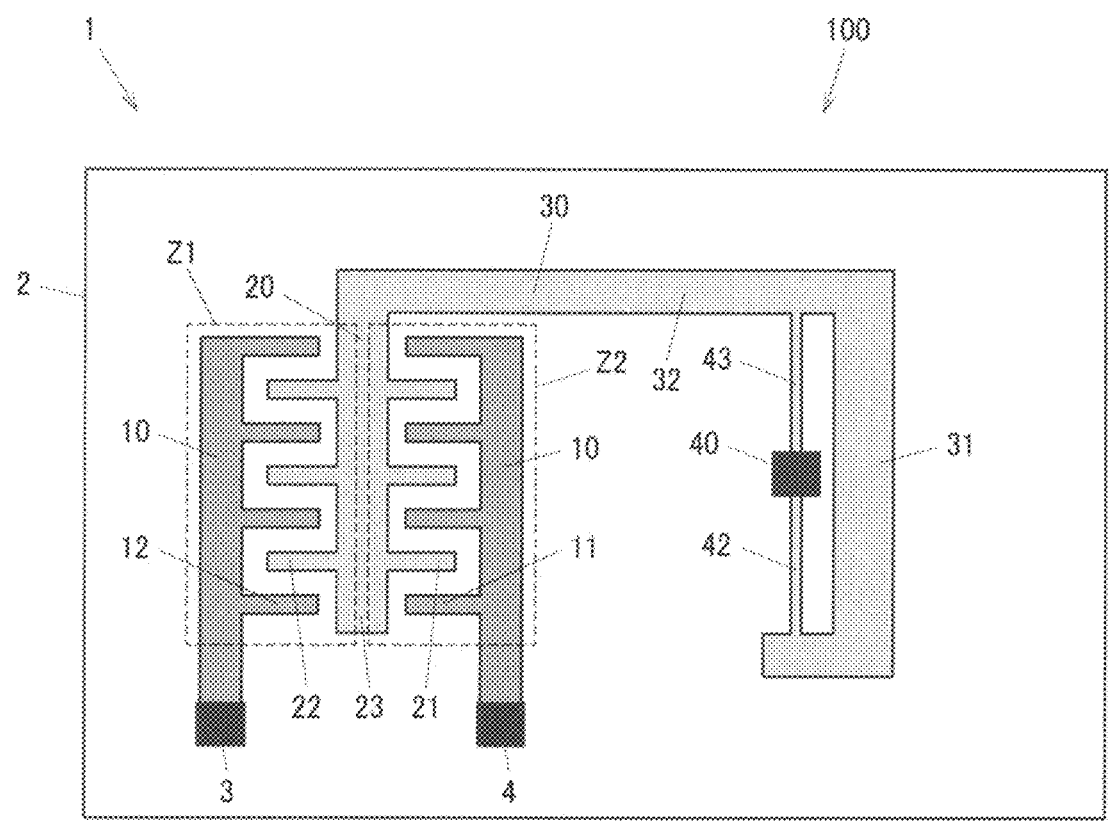
FIG. 9 is a plan view showing another configuration example of the physical quantity sensor.

FIGS. 9 and 10 show modifications of the configuration example of the physical quantity sensor 1 shown in FIG. 1. A configuration example shown in FIG. 9 is different from the configuration example in FIG. 1 in the arrangement of the first portion 31 of the first coupling portion 30. That is, in the configuration example shown in FIG. 9, the first portion 31 of the first coupling portion 30 is provided at the first direction DR1 side of the first fixed portion 40 in a direction along the second direction DR2 in a plan view seen from the third direction DR3, and couples the one end of the first support beam 42 and the one end of the second support beam 43. Even in this case, the same effect as that of the physical quantity sensor 1 of the configuration example shown in FIG. 1 can be obtained.

In a configuration example shown in FIG. 10, the first portion 31 of the first coupling portion 30 includes first portions 31A and 31B. That is, the one end of the first support beam 42 which is not coupled to the first fixed portion 40 and the one end of the second support beam 43 which is not coupled to the first fixed portion 40 are coupled to each other by the first portion 31B on the first direction DR1 side of the first fixed portion 40, and are coupled to each other by the first portion 31A in a direction opposite the first direction DR1 of the first fixed portion 40. Even in this case, the same effect as that of the physical quantity sensor 1 of the configuration example shown in FIG. 1 can be obtained.

In the configuration examples shown in FIGS. 1 and 7 to 10, as described with reference to FIG. 4, the case where the end portions of the fixed electrode 14 and the movable electrode 24 in the direction opposite the third direction DR3 in the initial state are flush with each other has been described, but the present embodiment is not limited thereto. For example, when the initial state in FIG. 4 is described as an example, in the detection portion Z1, one end of the movable electrode 24 may be offset with respect to one end of the fixed electrode 14 on the third direction DR3 side, and the other end of the fixed electrode 14 and the other end of the movable electrode 24 are not offset on the side opposite the third direction DR3 side, but the other end of the fixed electrode 14 may be offset with respect to the other end of the movable electrode 24 on the side opposite the third direction DR3. In the detection portion Z2, one end of the fixed electrode 14 is offset with respect to one end of the movable electrode 24 on the third direction DR3 side, and the other end of the fixed electrode 14 and the other end of the movable electrode 24 are not offset in the direction opposite the third direction DR3, but the other end of the movable electrode 24 may be offset with respect to the other end of the fixed electrode 14 on the side opposite the third direction DR3. That is, in the initial state, in each of the detection portions Z1 and Z2, the one end of the fixed electrode 14 and the one end of the movable electrode 24 on the third direction DR3 side may not be flush with each other, and the other end of the fixed electrode 14 and the other end of the movable electrode 24 on the side opposite the third direction DR3 side may not be flush with each other. In this way, for example, when the acceleration occurs in the third direction DR3, the facing area increases and the capacitance increases in the detection portion Z1, and the facing area decreases and the capacitance decreases in the detection portion Z2. On the other hand, when the acceleration occurs in the direction opposite the third direction DR3, the facing area decreases and the capacitance decreases in the detection portion Z1, and the facing area increases and the capacitance increases in the detection portion Z2. Accordingly, each of the detection portions Z1 and Z2 can detect both the acceleration in the third direction DR3 and the acceleration in the direction opposite the third direction DR3, and thus the detection sensitivity of the acceleration can be improved. In this way, for example, the acceleration in both the third direction DR3 and the direction opposite the third direction DR3 can be detected by a pair of the first fixed electrode portion 10 and the first movable electrode portion 20 in the detection portion Z1, and thus the two detection portions Z1 and Z2 are not required to be provided as the detection portions. Therefore, according to the present embodiment, the acceleration can be detected by one detection portion, and the physical quantity sensor 1 can be miniaturized.

2. Detailed Configuration Examples

Figure 11:
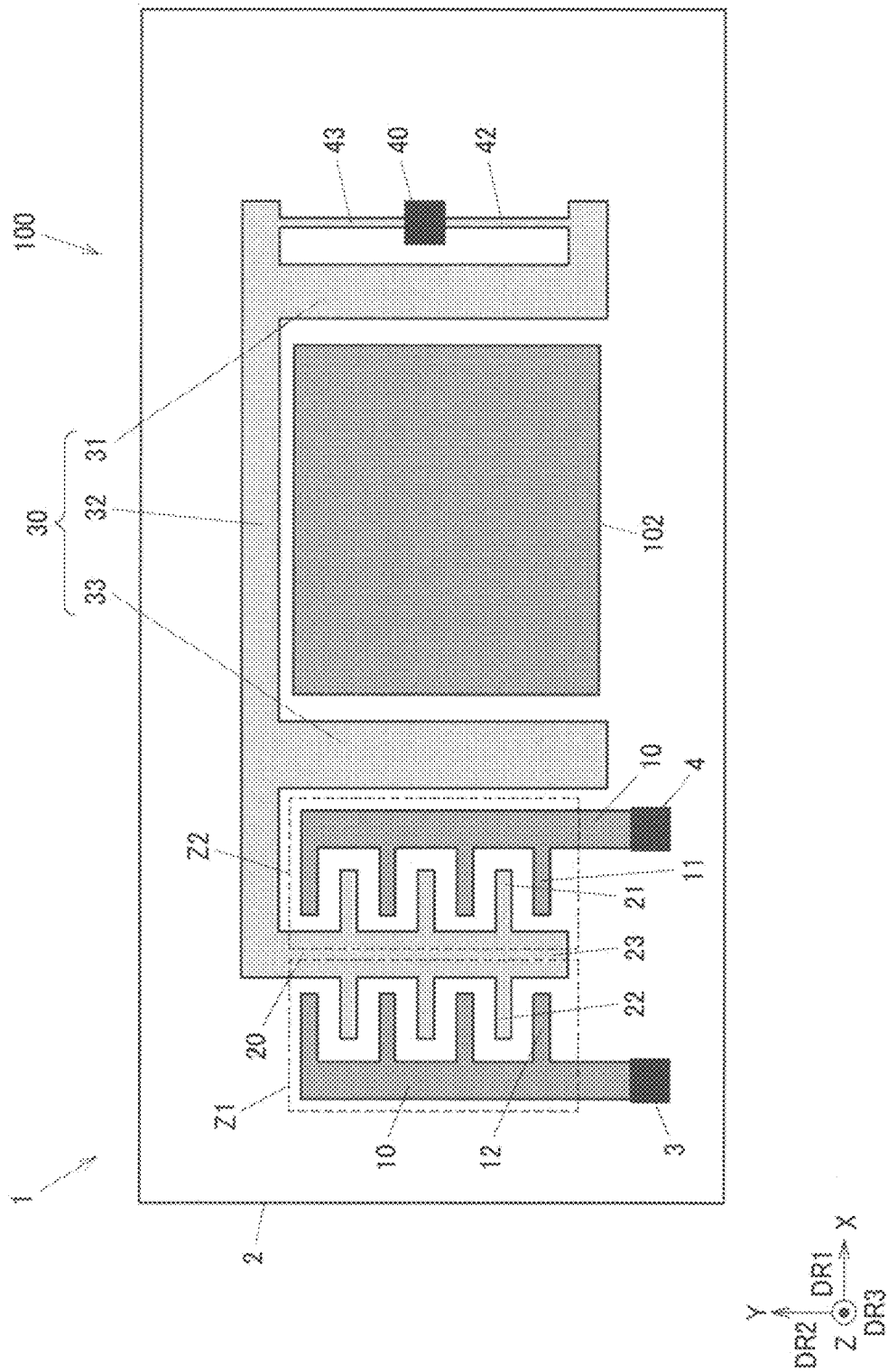
FIG. 11 is a plan view showing a first detailed example of the physical quantity sensor.

Next, detailed configuration examples of the physical quantity sensor 1 according to the present embodiment will be described. FIG. 11 is a first detailed example of the physical quantity sensor 1 according to the present embodiment. In the first detailed example, as compared with the physical quantity sensor 1 shown in FIG. 1, a second detection element 102 is provided in a region surrounded by the first portion 31 and the second portion 32 of the first coupling portion 30. The second detection element 102 is, for example, an acceleration sensor that detects acceleration in a direction along the first direction DR1. That is, the physical quantity sensor 1 detects the acceleration in the third direction DR3, which is a direction perpendicular to a plane of the substrate 2, by the first detection element 100, and detects, for example, the acceleration in the first direction DR1 in the plane by the second detection element 102. The second detection element 102 may be an element that detects acceleration in the second direction DR2 instead of the acceleration in the first direction DR1.

That is, the physical quantity sensor 1 according to the present embodiment may include the first detection element 100 including the first fixed electrode portions 10, the first movable electrode portion 20, the first fixed portion 40, the first support beam 42, the second support beam 43, and the first coupling portion 30, and the second detection element 102, and the second detection element 102 may be disposed in the region surrounded by the first portion 31 and the second portion 32 of the first coupling portion 30.

In this way, the physical quantity sensor 1 shown in FIG. 1 can detect the physical quantity such as acceleration in the first direction DR1 or the second direction DR2 together with the acceleration in the third direction DR3.

In the first detailed example shown in FIG. 11, the third portion 33 may be provided in the first coupling portion 30. That is, in the physical quantity sensor 1 according to the present embodiment, the first coupling portion 30 may include the third portion 33 coupled to the second portion 32 and disposed along the second direction DR2 side by side with the first movable electrode portion 20, and the second detection element 102 may be disposed in the region surrounded by the first portion 31, the second portion 32, and the third portion 33 of the first coupling portion 30.

As described with reference to FIG. 1, in this way, the third portion 33 provided at a position distant from the rotation shaft including the first support beam 42 and the second support beam 43 functions as a mass in the rotational motion of the first movable electrode portion 20, and thus the detection sensitivity of the acceleration in the third direction DR3, that is, the Z-axis direction can be improved.

Figure 12:
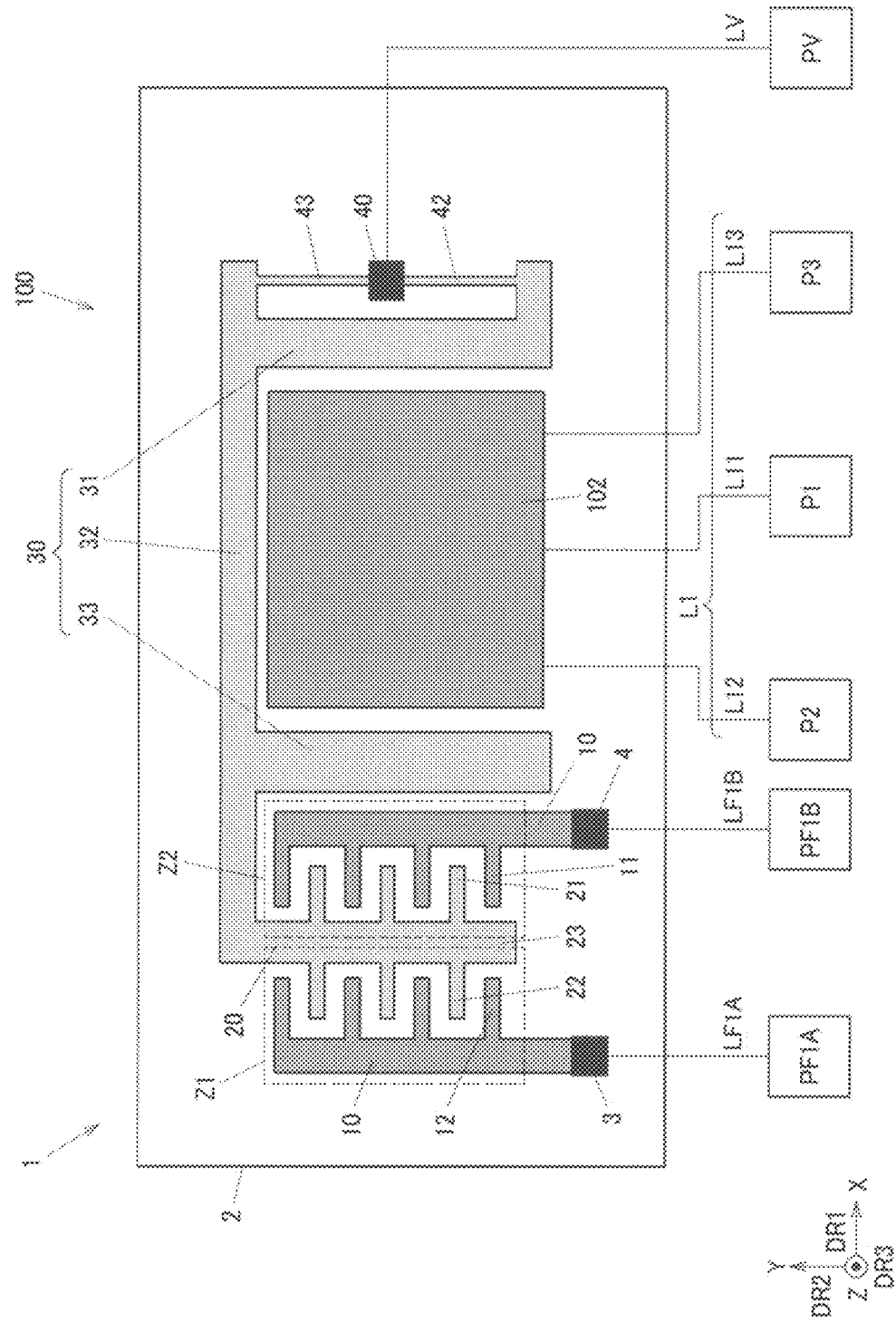
FIG. 12 is a plan view showing another configuration example of the first detailed example of the physical quantity sensor.

As shown in FIG. 12, in the first detailed example and the like of FIG. 11, the first fixed electrode wiring LF1A and LF1B coupled to the first fixed electrode portion 10, the first movable electrode wiring LV coupled to the first movable electrode portion 20, and a first wiring group L1 coupled to the second detection element 102 can be provided. The first wiring group L1 includes L11, L12, and L13. The first wiring group L1 may include either wiring L12 or L13.

That is, the present embodiment may include the first fixed electrode wiring LF1A and LF1B coupled to the first fixed electrode portions 10, the first movable electrode wiring LV coupled to the first movable electrode portion 20, and the first wiring group L1 coupled to the second detection element 102, and the first fixed electrode wiring LF1A and LF1B, the first movable electrode wiring LV, and the first wiring group L1 may be wired along the second direction DR2. In this way, the first fixed electrode portion 10 of the detection portion Z1 is coupled to the differential amplifier circuit QV (not shown) via the first fixed electrode wiring LF1A and the pad PF1A, the first fixed electrode portion 10 of the detection portion Z2 is coupled to the differential amplifier circuit QV via the first fixed electrode wiring LF1B and the pad PF1B, and the first movable electrode portion 20 is coupled to the differential amplifier circuit QV via the first movable electrode wiring LV and the pad PV, whereby the acceleration in the direction along the third direction DR3 can be detected. The wiring L11, L12, and L13 of the first wiring group L1 are coupled to the differential amplifier circuit QV via pads P1, P2, and P3, whereby the acceleration in the direction along the first direction DR1 can be detected. Since the plurality of wiring can be wired along the second direction DR2, terminals coupled to the wiring can be collected on one side, and the physical quantity sensor 1 can be miniaturized.

In the present embodiment, the first coupling portion 30 may not be provided in a space surrounded by the first portion 31, the second portion 32, and the third portion 33 of the first coupling portion 30 in the direction opposite the second direction DR2. Further, the first fixed electrode wiring LF1A and LF1B coupled to the first fixed electrode portions 10 and the first wiring group L1 coupled to the second detection element 102 are wired along the second direction DR2. Therefore, the first wiring group L1 can be wired in a manner of being led out to the direction opposite the second direction DR2 in which the first coupling portion 30 is not provided. Therefore, according to the present embodiment, the second portion 32 of the first coupling portion 30 is not disposed in a region where the first wiring group L1 is wired, and the first wiring group L1 can be wired without straddling the second portion 32. Therefore, generation of a capacitance between the first wiring group L1 and the second portion 32 can be prevented, and the second detection element 102 can be provided without deteriorating the accuracy of the acceleration detection in the third direction DR3.

Figure 13:
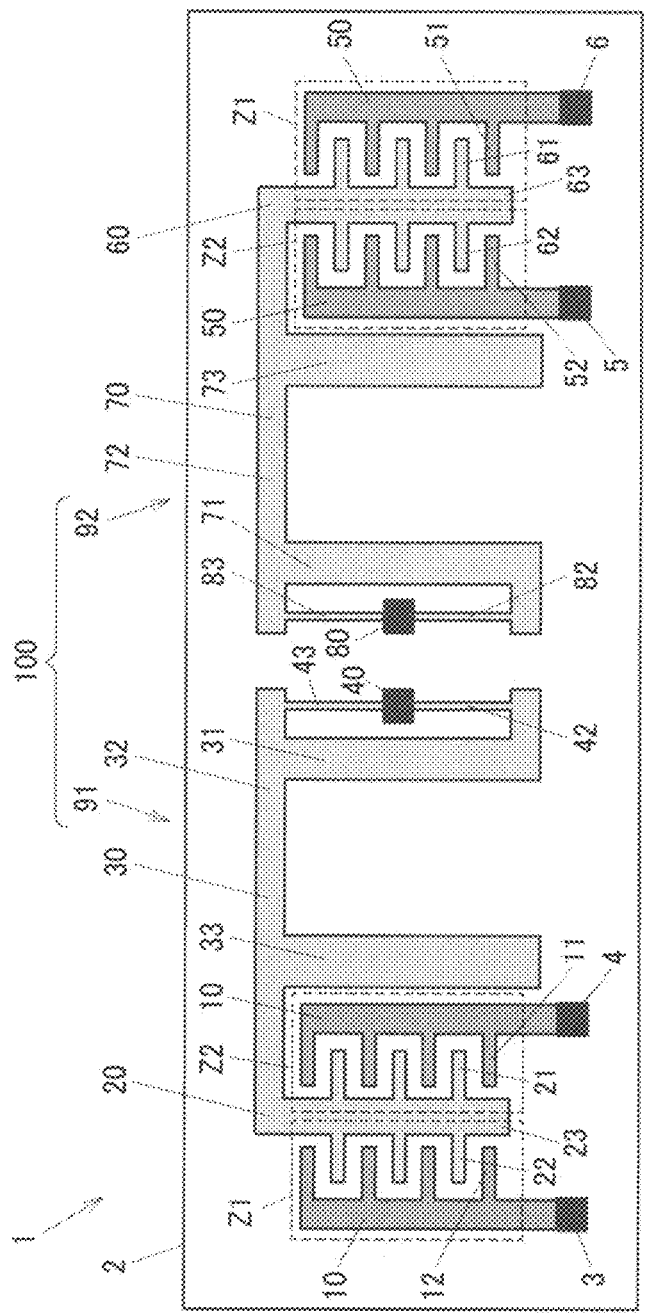
FIG. 13 is a plan view showing a second detailed example of the physical quantity sensor.

FIG. 13 is a second detailed example of the physical quantity sensor 1 according to the present embodiment. The second detailed example is different from the configuration example shown in FIG. 1 in the configuration of the first detection element 100. That is, the first detection element 100 of the second detailed example includes a first element portion 91 and a second element portion 92.

The first element portion 91 has a configuration similar to that of the first detection element 100 of the physical quantity sensor 1 shown in FIG. 1. That is, the first element portion 91 includes the first fixed electrode portions 10, the first movable electrode portion 20, the first coupling portion 30, the first fixed portion 40, the first support beam 42, and the second support beam 43. Here, the first fixed electrode portions 10, the first movable electrode portion 20, the first coupling portion 30, the first fixed portion 40, the first support beam 42, and the second support beam 43 are as described with reference to FIG. 1.

The second element portion 92 includes second fixed electrode portions 50, a second movable electrode portion 60, a second coupling portion 70, a second fixed portion 80, a third support beam 82, and a fourth support beam 83. Here, the second fixed electrode portions 50, the second movable electrode portion 60, the second coupling portion 70, the second fixed portion 80, the third support beam 82, and the fourth support beam 83 of the second element portion 92 correspond to the first fixed electrode portions 10, the first movable electrode portion 20, the first coupling portion 30, the first fixed portion 40, the first support beam 42, and the second support beam 43 of the first element portion 91, respectively. A third fixed electrode 51, a fourth fixed electrode 52, a second base fixed electrode 53, and fixed electrodes 54 of the second element portion 92 respectively correspond to the first fixed electrode 11, the second fixed electrode 12, the first base fixed electrode 13, and the fixed electrodes 14 of the first element portion 91, and the third movable electrode 61, the fourth movable electrode 62, the second base movable electrode 63, and movable electrodes 64 of the second element portion 92 respectively correspond to the first movable electrode 21, the second movable electrode 22, the first base movable electrode 23, and the movable electrodes 24 of the first element portion 91. Further, a fourth portion 71 and a fifth portion 72 in the second coupling portion 70 of the second element portion 92 correspond to the first portion 31 and the second portion 32 in the first coupling portion 30 of the first element portion 91, respectively.

Figure 14:
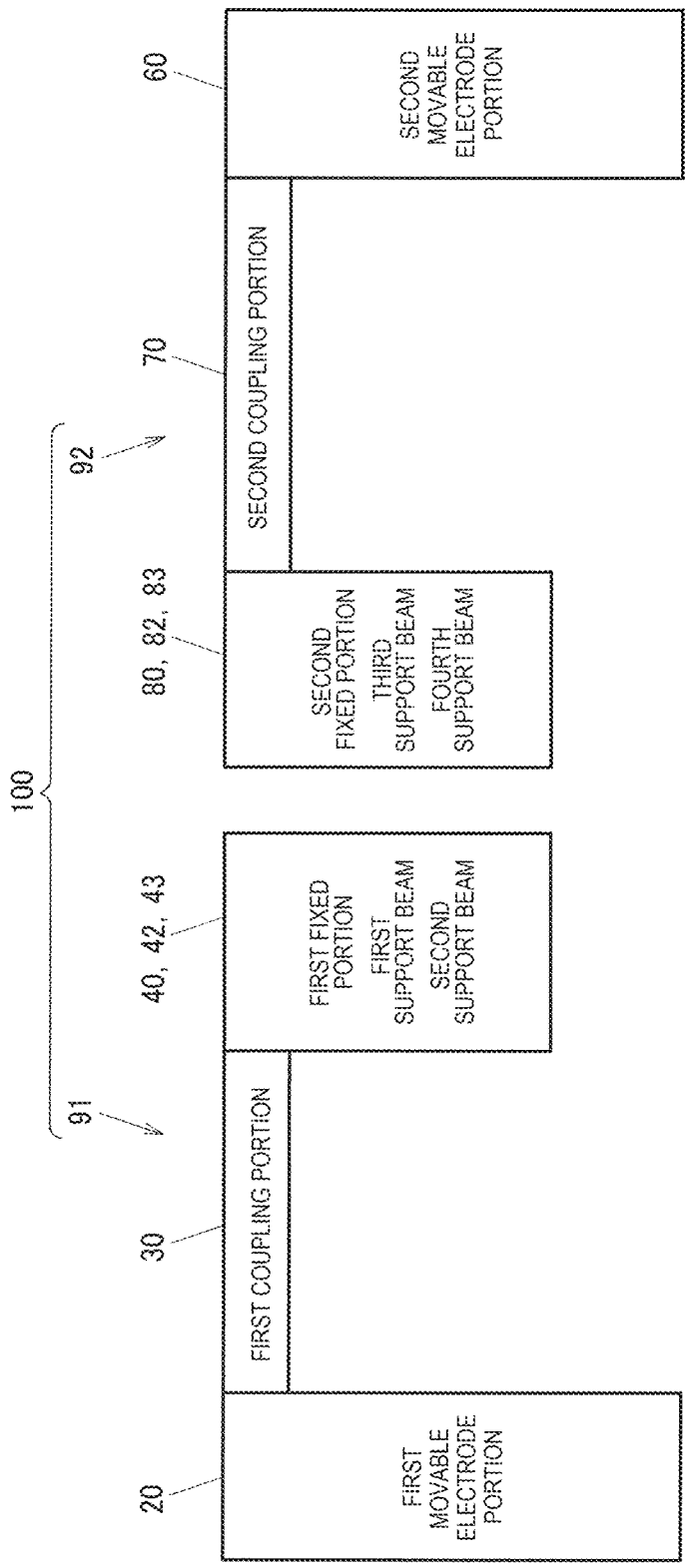
FIG. 14 is a diagram illustrating an arrangement of the second detailed example of the physical quantity sensor.

As shown in FIG. 14, in the first element portion 91 of the physical quantity sensor 1, the first movable electrode portion 20, the first coupling portion 30, the first fixed portion 40, and the like are arranged in the order of the first movable electrode portion 20, the first coupling portion 30, the first fixed portion 40, and the like along the first direction DR1 in the plan view in the third direction DR3 orthogonal to the substrate 2. In the second element portion 92, the second movable electrode portion 60, the second coupling portion 70, the second fixed portion 80, and the like are arranged in an order of the second fixed portion 80, the second coupling portion 70, the second movable electrode portion 60, and the like along the first direction DR1 in the plan view in the third direction DR3. Further, the first element portion 91 and the second element portion 92 are arranged in the order of the first element portion 91 and the second element portion 92 along the first direction DR1 in the plan view in the third direction DR3 orthogonal to the substrate 2.

That is, the physical quantity sensor 1 according to the present embodiment includes the second fixed electrode portions 50 provided at the substrate 2, the second movable electrode portion 60 provided such that the movable electrode 64 faces the fixed electrode 54 of the second fixed electrode portions 50, at least one second fixed portion 80 fixed to the substrate 2, the third support beam 82 having one end coupled to the second fixed portion 80, the fourth support beam 83 having one end coupled to the second fixed portion 80, and the second coupling portion 70 coupling the other end of the third support beam 82 and the other end of the fourth support beam 83 to the second movable electrode portion 60. Further, in the plan view, the second fixed portion 80 and the second movable electrode portion 60 may be disposed along the first direction DR1, the third support beam 82 and the fourth support beam 83 may be disposed along the second direction DR2, and the second coupling portion 70 may include the fourth portion 71 disposed along the second direction DR2 side by side with the third support beam 82 and the fourth support beam 83, and the fifth portion 72 coupled to the fourth portion 71 and the second movable electrode portion 60 and disposed along the first direction DR1.

In this way, similar to the case of the configuration example in FIG. 1, the acceleration in the third direction DR3 and the fourth direction DR4 can be detected by the first element portion 91 of the first detection element 100. Further, in the second element portion 92 of the first detection element 100, a movable body including the second movable electrode portion 60 swings along the third direction DR3 using the third support beam 82 and the fourth support beam 83 as torsion springs, whereby the acceleration in the third direction DR3 or the fourth direction DR4 can also be detected. That is, the acceleration in the fourth direction DR4 can be detected by the detection portion Z1 of the second element portion 92, and the acceleration in the third direction DR3 can be detected by the detection portion Z2. Therefore, according to the present embodiment, the acceleration in the third direction DR3 and the fourth direction DR4 can be detected by elements of both the first element portion 91 and the second element portion 92, and the acceleration in the third direction DR3 and the fourth direction DR4 can be detected with high sensitivity.

Figure 15:
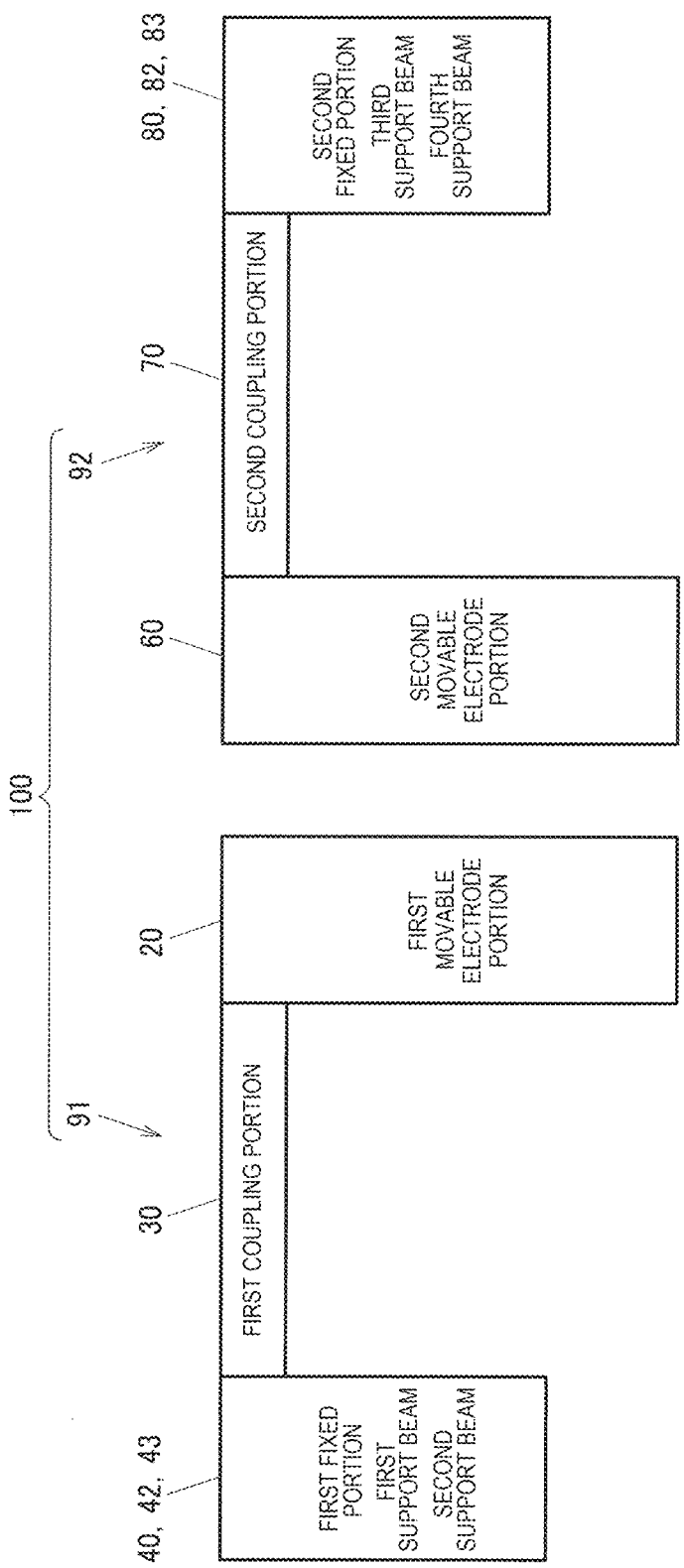
FIG. 15 is a diagram illustrating an arrangement of a comparative example of the second detailed example of the physical quantity sensor.

FIG. 15 is a diagram showing a comparative example of the present embodiment. FIG. 15 is a plan view of the physical quantity sensor 1 according to the present embodiment in the third direction DR3 orthogonal to the substrate 2 as in the case of FIG. 14. This comparative example shows the physical quantity sensor 1 in which the first fixed portion 40, the first coupling portion 30, the first movable electrode portion 20, the second movable electrode portion 60, the second coupling portion 70, the second fixed portion 80, and the like are arranged in this order along the first direction DR1 in the plan view in the third direction DR3. In this comparative example, the first fixed portion 40 and the second fixed portion 80 are provided at positions separated from each other as compared with the case of the second detailed example shown in FIGS. 13 and 14. Therefore, when warpage occurs in the substrate 2 due to stress, influences of the warpage on the first fixed portion 40 and the second fixed portion 80 are different, and thus the accuracy of the detection of the acceleration in the third direction DR3 deteriorates. Therefore, in the comparative example shown in FIG. 15, there is a problem that the detection sensitivity of the acceleration is easily affected by the warpage of the substrate 2 due to thermal stress or external stress. That is, in the acceleration sensor in the Z-axis direction which is the third direction DR3, in the case where two detection elements which have a shape of a seesaw structure are provided, when portions which are fixed portions of the seesaws are disposed apart from each other by the detection elements, the portions are easily affected by the warpage of the substrate 2 and the like, and it is difficult to detect the acceleration with high accuracy.

In this regard, according to the second detailed example shown in FIG. 13, the first fixed portion 40 of the first element portion 91 and the second fixed portion 80 of the second element portion 92 can be disposed close to each other. Therefore, even if the warpage of the substrate 2 and the like of the physical quantity sensor 1 occurs, the deterioration of the accuracy of the acceleration detection due to the influence of the warpage can be prevented. Although the case where the two detection elements each having the seesaw structure are provided has been described above, the same applies to a case where three or more detection elements are provided.

Figure 16:
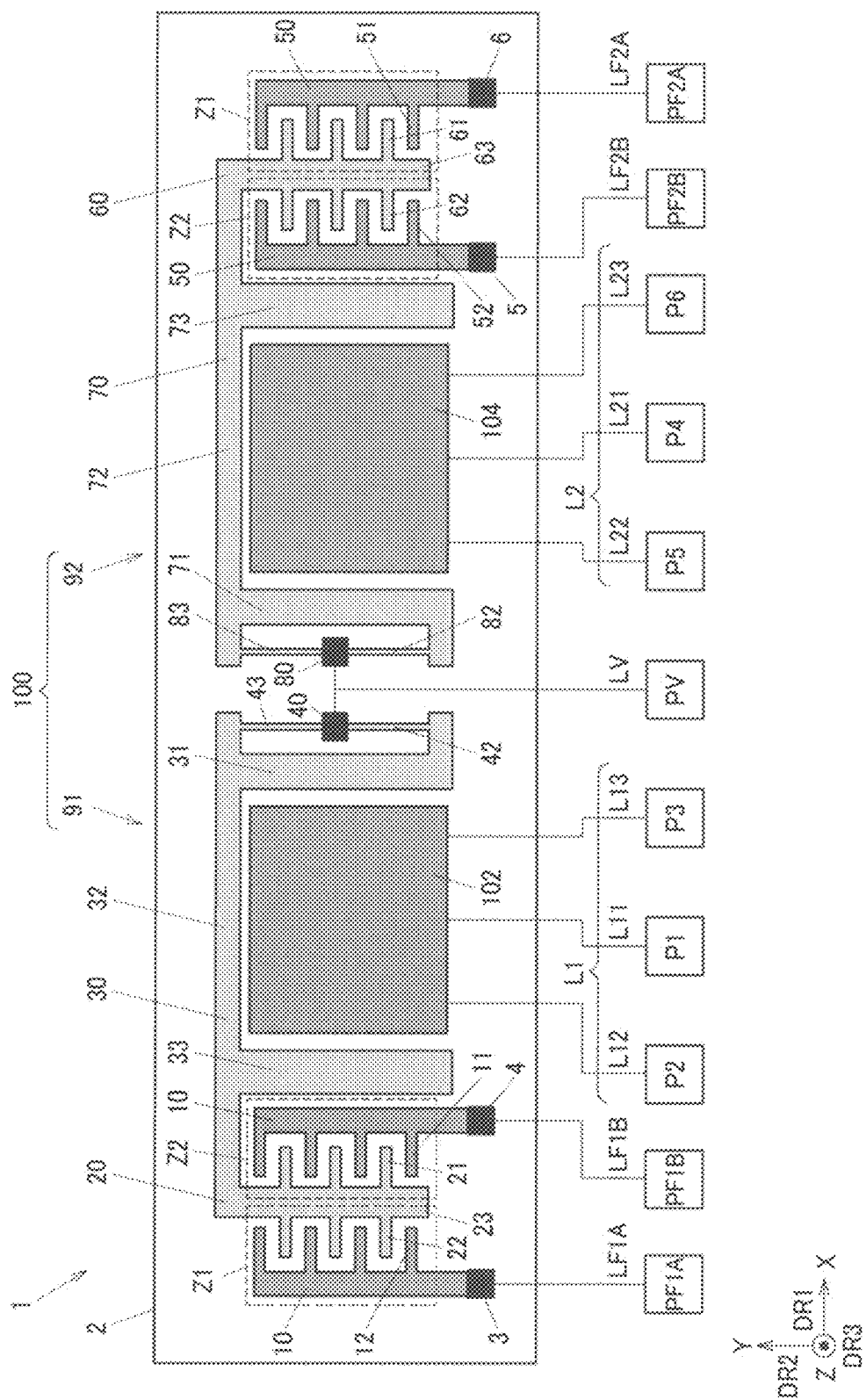
FIG. 16 is a plan view showing a third detailed example of the physical quantity sensor.

FIG. 16 is a third detailed example of the physical quantity sensor 1 according to the present embodiment. The physical quantity sensor 1 of the third detailed example includes the second detection element 102 and a third detection element 104 in addition to the configuration of the second detailed example. The second detection element 102 is, for example, an acceleration sensor in the first direction DR1 other than the third direction DR3. The third detection element 104 is, for example, an acceleration sensor in the second direction DR2 other than the third direction DR3.

That is, the physical quantity sensor 1 according to the present embodiment includes the first detection element 100 including the first fixed electrode portions 10, the first movable electrode portion 20, the first fixed portion 40, the first support beam 42, the second support beam 43, the first coupling portion 30, the second fixed electrode portion 50, the second movable electrode portion 60, the second fixed portion 80, the third support beam 82, the fourth support beam 83, and the second coupling portion 70, the second detection element 102, and the third detection element 104. Further, the second detection element 102 may be disposed in a region surrounded by the first portion 31 and the second portion 32 of the first coupling portion 30, and the third detection element 104 may be disposed in a region surrounded by the fourth portion 71 and the fifth portion 72 of the second coupling portion 70.

According to the third detailed example, as shown in FIG. 16, the second detection element 102 and the third detection element 104 are provided. Therefore, the acceleration in the first direction DR1 can be detected by the second detection element 102, and the acceleration in the second direction DR2 can be detected by the third detection element 104. Therefore, the physical quantity sensor 1 can detect the acceleration in the first direction DR1 and the second direction DR2 together with the acceleration in the third direction DR3.

According to the third detailed example, in the plan view in the third direction DR3 orthogonal to the substrate 2, the second detection element 102 is disposed in a region surrounded by the first portion 31 and the second portion 32 of the first coupling portion 30 and the first fixed electrode portion 10, and the third detection element 104 is disposed in a region surrounded by the fourth portion 71 and the fifth portion 72 of the second coupling portion 70 and the second fixed electrode portion 50. Therefore, in the plan view in the third direction DR3 orthogonal to the substrate 2, the first element portion 91, the second element portion 92, the second detection element 102, and the third detection element 104 can be arranged side by side in a rectangular region of the substrate 2. Therefore, these elements can be provided without generating the dead space, and the physical quantity sensor 1 can be miniaturized.

In the third detailed example shown in FIG. 16, the first element portion 91 may include the third portion 33 in the first coupling portion 30, and the second element portion 92 may include a sixth portion 73 in the second coupling portion 70. Here, the third portion 33 of the first coupling portion 30 is the same as the third portion 33 described with reference to FIG. 1. The sixth portion 73 of the second coupling portion 70 in the second element portion 92 is a portion corresponding to the third portion 33 of the first coupling portion 30 in the first element portion 91.

That is, in the physical quantity sensor 1 according to the present embodiment, the first coupling portion 30 includes the third portion 33 coupled to the second portion 32 and disposed along the second direction DR2 side by side with the first movable electrode portion 20. The second coupling portion 70 includes the sixth portion 73 coupled to the fifth portion 72 and disposed along the second direction DR2 side by side with the second movable electrode portion 60. Further, the second detection element 102 may be disposed in the region surrounded by the first portion 31, the second portion 32, and the third portion 33 of the first coupling portion 30, and the third detection element 104 may be disposed in a region surrounded by the fourth portion 71, the fifth portion 72, and the sixth portion 73 of the second coupling portion 70.

As described above, the third portion 33 of the first coupling portion 30 functioning as the mass portion at the position distant from the rotation shaft including the first support beam 42 and the second support beam 43 can be provided, the mass of the entire movable body including the first movable electrode portion 20 and the distance from the rotation shaft can be gained. Therefore, the detection sensitivity of the acceleration in the Z axis can be improved. Similarly, in the sixth portion 73 of the second coupling portion 70, a mass of the entire movable body including the second movable electrode portion 60 and a distance from a rotation shaft including the third support beam 82 and the fourth support beam 83 can be gained, and the detection sensitivity of the acceleration in the Z axis can be improved.

In the third detailed example shown in FIG. 16, the first fixed electrode wiring LF1A and LF1B coupled to the first fixed electrode portions 10, the first movable electrode wiring LV coupled to the first movable electrode portion 20, the first wiring group L1 coupled to the second detection element 102, second fixed electrode wiring LF2A and LF2B coupled to the second fixed electrode portions 50, second movable electrode wiring LV coupled to the second movable electrode portion 60, and a second wiring group L2 coupled to the third detection element 104 may be provided. Here, the first fixed electrode wiring LF1A and LF1B, the first movable electrode wiring LV, and the first wiring group L1 are as described with reference to FIG. 12. The second fixed electrode wiring LF2A and LF2B, the second movable electrode wiring LV, and the second wiring group L2 are wiring corresponding to the first fixed electrode wiring LF1A and LF1B, the first movable electrode wiring LV, and the first wiring group L1 on the second element portion 92 side, respectively. Further, the first fixed electrode wiring LF1A and LF1B and the first movable electrode wiring LV are coupled to the differential amplifier circuit QV provided outside the physical quantity sensor 1 via the pads PF1A, PF1B, and PV, respectively, as described with reference to FIG. 12. The second fixed electrode wiring LF2A and LF2B and the second movable electrode wiring LV are coupled to the differential amplifier circuit QV via pads PF2A, PF2B, and PV, respectively.

That is, the physical quantity sensor 1 according to the present embodiment may include the first fixed electrode wiring LF1A and LF1B coupled to the first fixed electrode portions 10, the first movable electrode wiring LV coupled to the first movable electrode portion 20, the second fixed electrode wiring LF2A and LF2B coupled to the second fixed electrode portions 50, the second movable electrode wiring LV coupled to the second movable electrode portion 60, the first wiring group L1 coupled to the second detection element 102, and the second wiring group L2 coupled to the third detection element 104. Further, the first fixed electrode wiring LF1A and LF1B, the first movable electrode wiring LV, the second fixed electrode wiring LF2A and LF2B, the second movable electrode wiring LV, the first wiring group L1, and the second wiring group L2 may be wired along the second direction DR2. In this way, similarly to the case in FIG. 12, the acceleration in the direction along the third direction DR3 and the acceleration in the direction along the first direction DR1 can be detected. The second fixed electrode portion 50 of the detection portion Z1 is coupled to the differential amplifier circuit QV via the second fixed electrode wiring LF2A and the pad PF2A, the second fixed electrode portion 50 of the detection portion Z2 is coupled to the differential amplifier circuit QV via the second fixed electrode wiring LF2B and the pad PF2B, and the second movable electrode portion 60 is coupled to the differential amplifier circuit QV via the second movable electrode wiring LV and the pad PV, whereby the acceleration in the direction along the third direction DR3 can be detected. Further, the second wiring group L2 is coupled to the differential amplifier circuit QV via pads P4, P5, and P6, whereby the acceleration in the direction along the second direction DR2 can be detected. According to the present embodiment, since the plurality of wiring can be wired along the second direction DR2, the pads coupled to the wiring can be collected on one side, and the physical quantity sensor 1 can be miniaturized.

As described with reference to FIG. 12, according to the present embodiment, the second portion 32 of the first coupling portion 30 is not disposed in the region where the first wiring group L1 is wired, and the first wiring group L1 can be wired in a manner of not straddling the second portion 32, and thus the generation of the capacitance between the first wiring group L1 and the second portion 32 can be prevented. Similarly, in the third detection element 104, the second wiring group L2 can be wired in a manner of not straddling the fifth portion 72, and generation of capacitance between the second wiring group L2 and the fifth portion 72 can be prevented. Therefore, the second detection element 102 and the third detection element 104 can be provided without deteriorating the accuracy of the acceleration detection in the third direction DR3.

In the third detailed example shown in FIG. 16, the detection portion Z1 and the detection portion Z2 of the first element portion 91 may be arranged along the second direction DR2, and the detection portion Z1 and the detection portion Z2 of the second element portion 92 may also be arranged along the second direction DR2. For example, by changing thicknesses of the fixed electrodes 14 and the movable electrodes 24 of the first element portion 91 in the second direction DR2 and changing thicknesses of the fixed electrodes 54 and the movable electrodes 64 of the second element portion 92 in the second direction DR2, the detection portion Z1 and the detection portion Z2 can be arranged along the second direction DR2 in each of the first element portion 91 and the second element portion 92.

Figure 17:
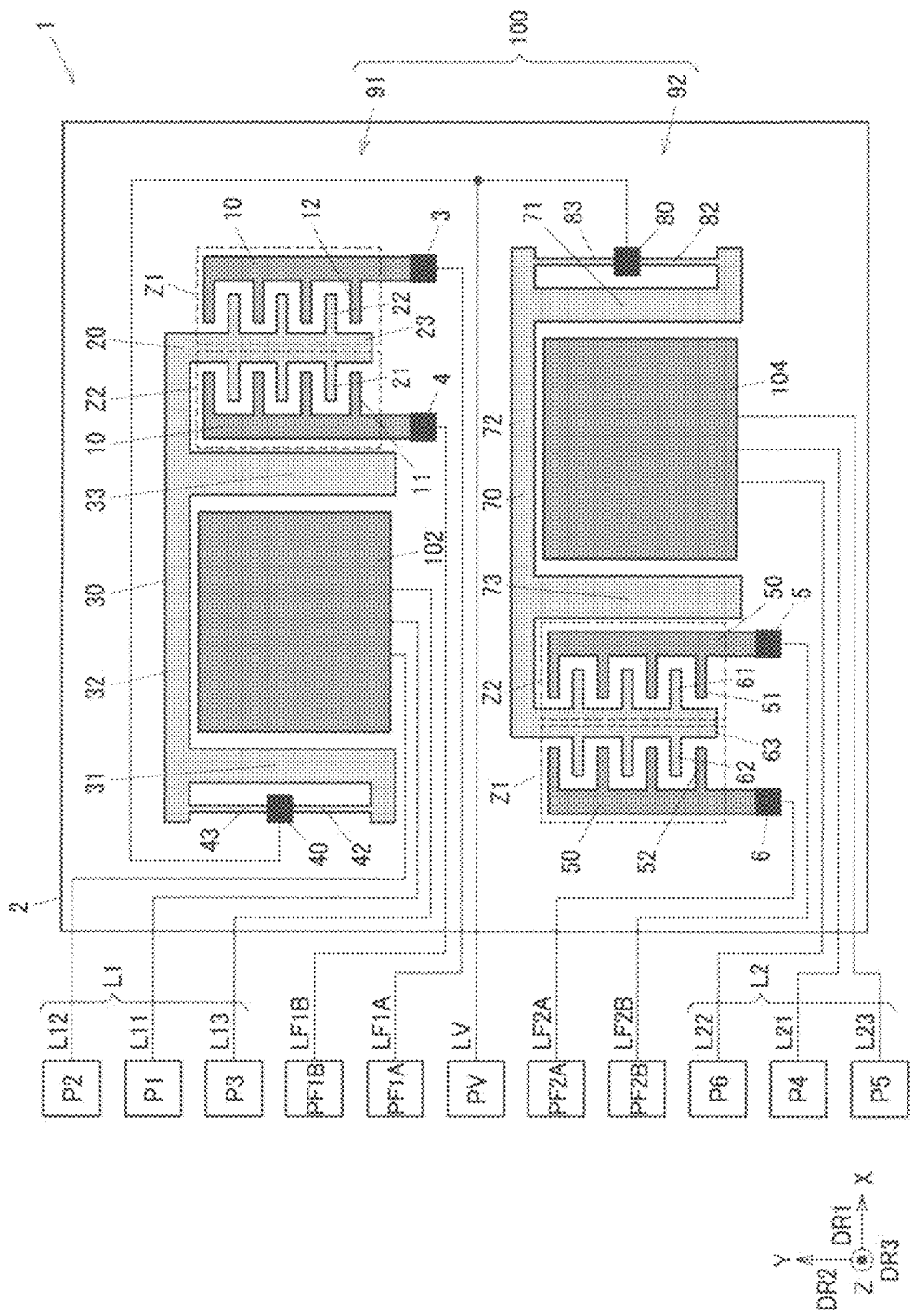
FIG. 17 is a plan view showing a modification of the third detailed example of the physical quantity sensor.
Figure 18:
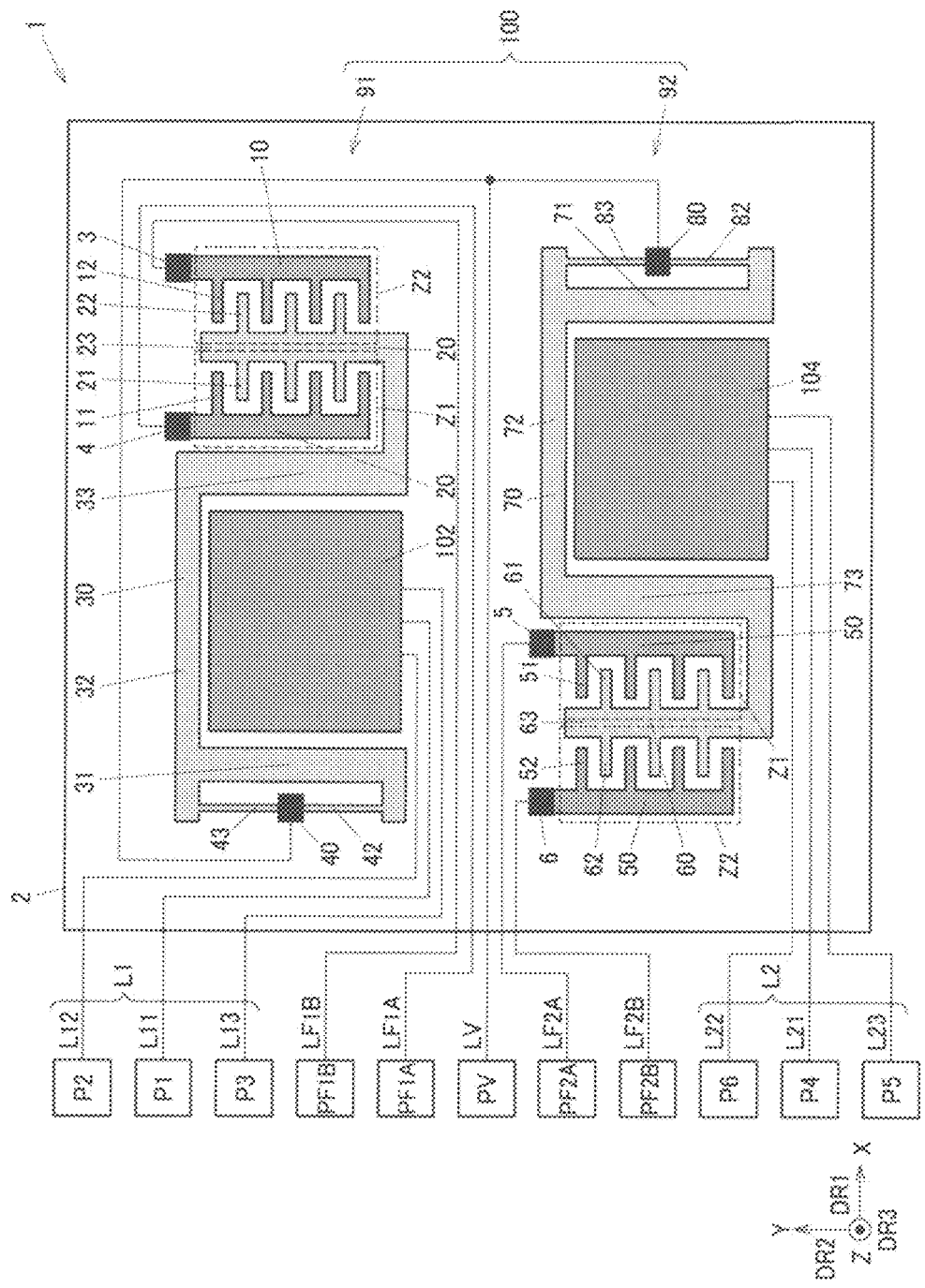
FIG. 18 is a plan view showing a modification of the third detailed example of the physical quantity sensor.

FIGS. 17 and 18 are modifications of the third detailed example shown in FIG. 16. The modification shown in FIG. 17 is different from the third detailed example in the arrangement of the first element portion 91 and the second element portion 92. Specifically, in the modification shown in FIG. 17, the first element portion 91 and the second element portion 92 are arranged in an order of the second element portion 92 and the first element portion 91 in the second direction DR2. In FIG. 18, as in FIG. 17, the first element portion 91 and the second element portion 92 are arranged along the second direction DR2. Differences from FIG. 17 are that the fixed portions 3 and 4 of the first element portion 91 are provided at the second direction DR2 side, and the fixed portions 5 and 6 of the second element portion 92 are also provided at the second direction DR2 side. Further, the first coupling portion 30 and the first movable electrode portion 20 are arranged in a manner of being coupled in an S-shape via the third portion 33 of the first coupling portion 30. Similarly, in the second element portion 92, the second coupling portion 70 and the second movable electrode portion 60 are arranged in a manner of being coupled in an S-shape via the sixth portion 73 of the second coupling portion 70. The modifications shown in FIGS. 17 and 18 can also obtain the same effect as that of the third detailed example.

Figure 19:
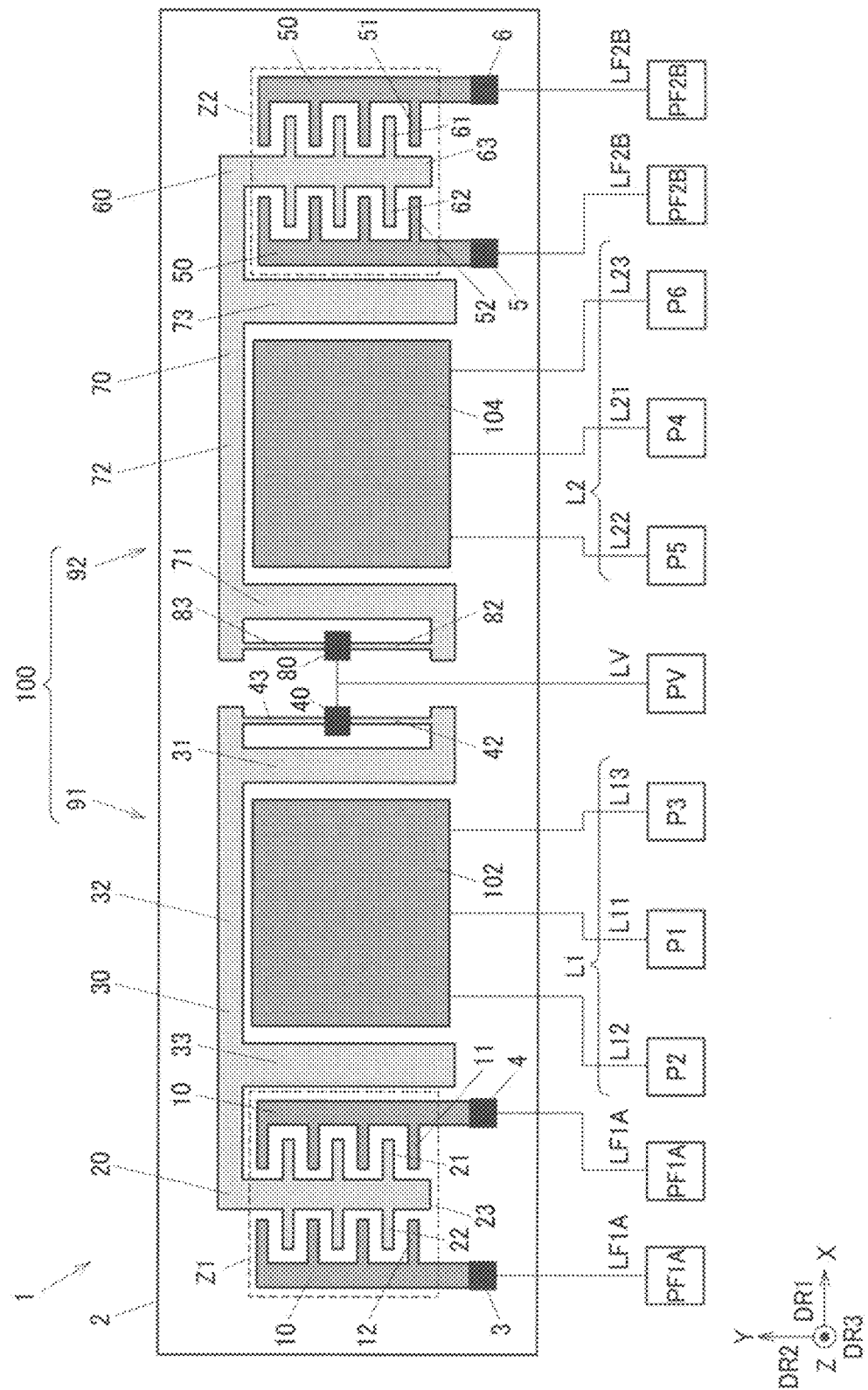
FIG. 19 is a plan view showing a modification of the third detailed example of the physical quantity sensor.

FIG. 19 is another modification of the third detailed example shown in FIG. 16. The modification shown in FIG. 19 is different from the third detailed example in arrangement methods of the detection portions Z1 and Z2. In the modification shown in FIG. 19, the first element portion 91 includes the detection portion Z1, and the second element portion 92 includes the detection portion Z2. That is, in the modification shown in FIG. 19, the first element portion 91 may not include one of the detection portions Z1 and Z2, and the second element portion 92 may not include the other one thereof. In this case, as described with reference to FIG. 4, the first element portion 91 can detect the acceleration in the fourth direction DR4 by the detection portion Z1, and the second element portion 92 can detect the acceleration in the third direction DR3 by the detection portion Z2. Therefore, the acceleration in the third direction DR3 and the fourth direction DR4 can be detected by the first detection element 100 including the first element portion 91 and the second element portion 92. Even when the detection portions Z1 and Z2 are provided in this manner, the same effect as that of the third detailed example can be obtained.

3. Inertial Measurement Unit

Figure 20:
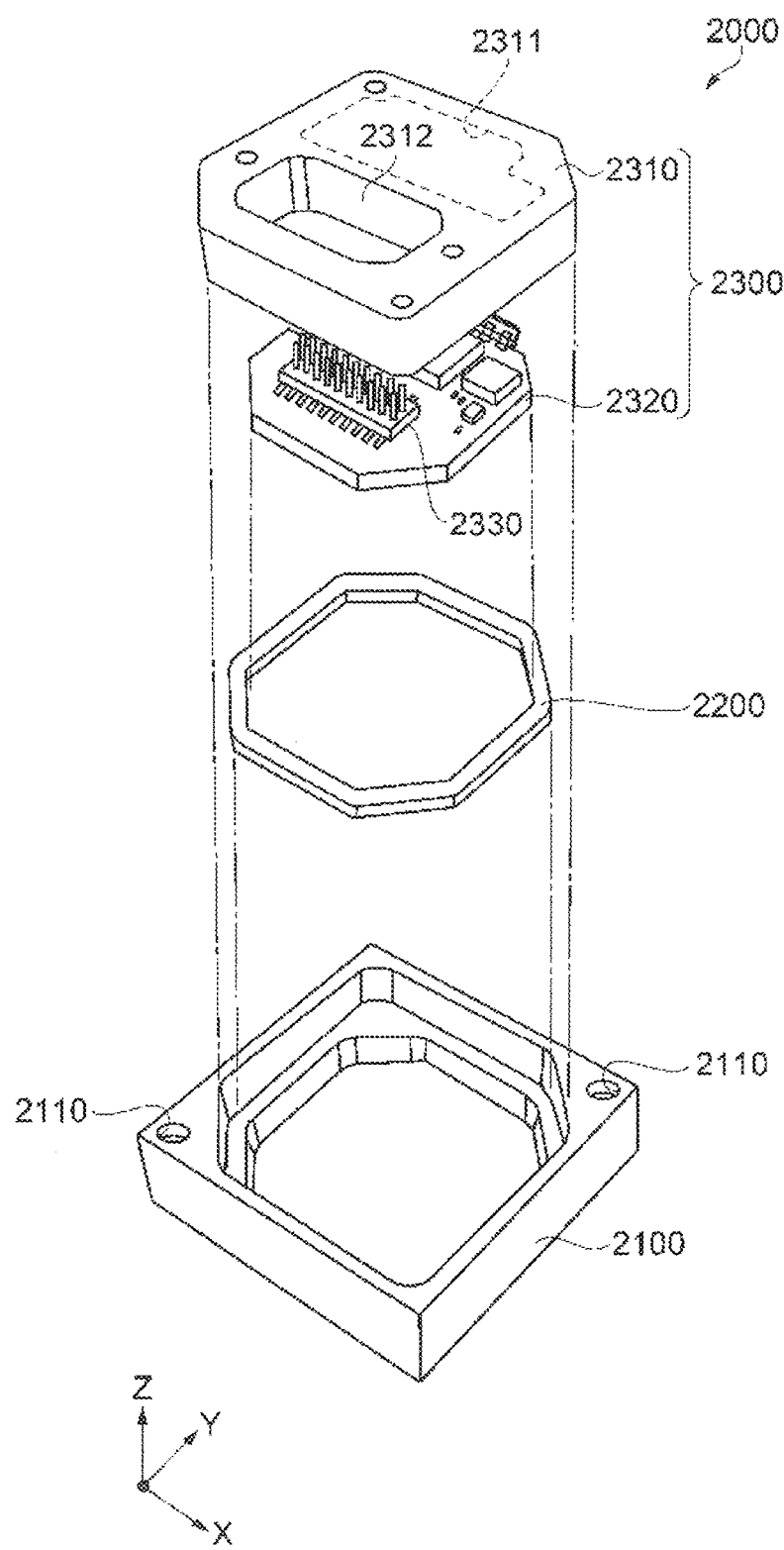
FIG. 20 is an exploded perspective view showing a schematic configuration of an inertial measurement unit including the physical quantity sensor.

Next, an example of an inertial measurement unit 2000 according to the present embodiment will be described with reference to FIGS. 20 and 21. The inertial measurement unit (IMU) 2000 shown in FIG. 20 is a device that detects inertial momentum such as a posture or a behavior of a moving body such as an automobile or a robot. The inertial measurement unit 2000 is a six-axis motion sensor including an acceleration sensor that detects acceleration ax, ay, and az in directions along three axes and an angular velocity sensor that detects angular velocities cox, coy, and coz around the three axes.

The inertial measurement unit 2000 has a rectangular parallelepiped shape and has a substantially square planar shape. Screw holes 2110 as mount portions are formed in the vicinity of two vertexes located in a diagonal direction of the square. Two screws can be inserted into the two screw holes 2110 to fix the inertial measurement unit 2000 to a mounted surface of a mounted body such as an automobile. It is also possible to reduce a size of the inertial measurement unit 2000 to a size that can be mounted on a smartphone or a digital camera, for example, by selecting a component or changing a design.

The inertial measurement unit 2000 includes an outer case 2100, a bonding member 2200, and a sensor module 2300, and has a configuration in which the sensor module 2300 is inserted inside the outer case 2100 with the bonding member 2200 interposed therebetween. The sensor module 2300 includes an inner case 2310 and a circuit board 2320. The inner case 2310 is formed with a recess 2311 for preventing contact with the circuit board 2320 and an opening 2312 for exposing a connector 2330 to be described later. Further, the circuit board 2320 is bonded to a lower surface of the inner case 2310 via an adhesive.

Figure 21:
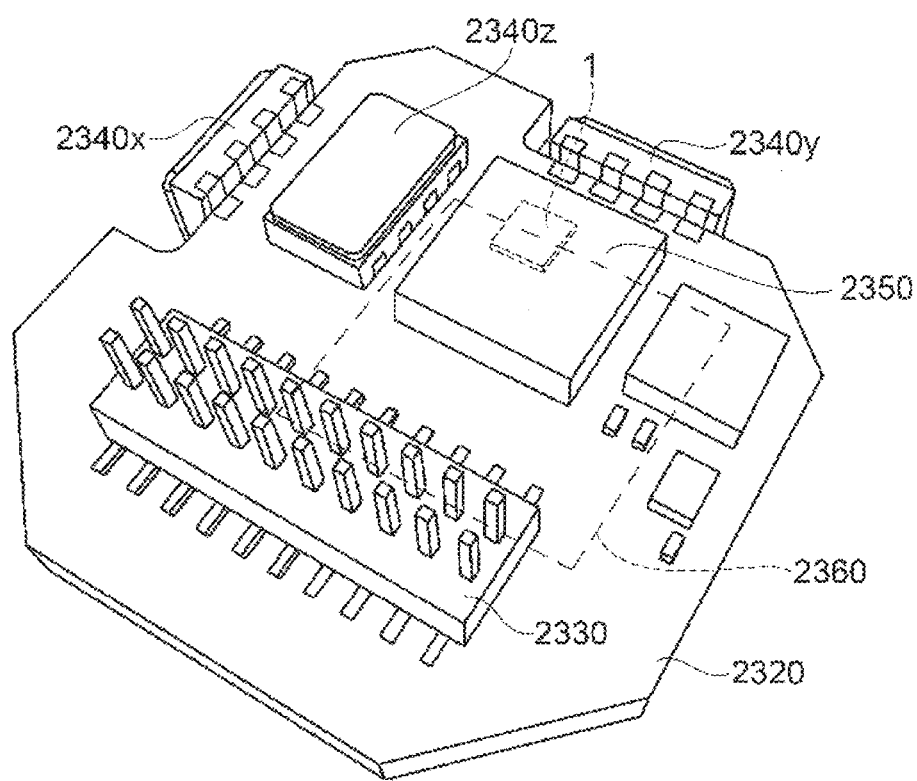
FIG. 21 is a perspective view of a circuit board of the physical quantity sensor.

As shown in FIG. 21, the connector 2330, an angular velocity sensor 2340z that detects an angular velocity around the Z axis, an acceleration sensor unit 2350 that detects acceleration in the x-axis, y-axis, and z-axis directions, and the like are mounted on an upper surface of the circuit board 2320. An angular velocity sensor 2340x that detects an angular velocity around the X axis and an angular velocity sensor 2340y that detects an angular velocity around the Y axis are mounted on a side surface of the circuit board 2320.

The acceleration sensor unit 2350 includes at least the physical quantity sensor 1 that measures the acceleration in the Z-axis direction described above, and can detect the acceleration in one axial direction or the acceleration in two axial directions or three axial directions as necessary. The angular velocity sensors 2340x, 2340y, and 2340z are not particularly limited, and for example, a vibration gyro sensor using a Coriolis force can be used.

A control IC 2360 is mounted on a lower surface of the circuit board 2320. The control IC 2360 as a control unit that performs control based on a detection signal output from the physical quantity sensor 1 is, for example, a micro controller unit (MCU), includes a storage unit including a nonvolatile memory, an A/D converter, and the like, and controls units of the inertial measurement unit 2000. Besides, a plurality of electronic components are mounted on the circuit board 2320.

As described above, the inertial measurement unit 2000 according to the present embodiment includes the physical quantity sensor 1 and the control IC 2360 as the control unit that performs the control based on the detection signal output from the physical quantity sensor 1. According to the inertial measurement unit 2000, since the acceleration sensor unit 2350 including the physical quantity sensor 1 is used, the inertial measurement unit 2000 capable of obtaining the effect of the physical quantity sensor 1 and achieving the high accuracy and the like can be provided.

The inertial measurement unit 2000 is not limited to the configurations in FIGS. 20 and 21. For example, the inertial measurement unit 2000 may have a configuration in which only the physical quantity sensor 1 is provided as the inertial sensor without providing the angular velocity sensors 2340x, 2340y, and 2340z. In this case, for example, the inertial measurement unit 2000 may be implemented by accommodating the physical quantity sensor 1 and the control IC 2360 that implements the control unit in a package that is an accommodating container.

As described above, the physical quantity sensor according to the present embodiment relates to a physical quantity sensor including: a first fixed electrode portion provided at a substrate; a first movable electrode portion provided such that a movable electrode faces a fixed electrode of the first fixed electrode portion; at least one first fixed portion fixed to the substrate; a first support beam having one end coupled to the first fixed portion; a second support beam having one end coupled to the first fixed portion; and a first coupling portion coupling the other end of the first support beam and the other end of the second support beam to the first movable electrode portion. Further, when three directions orthogonal to one another are defined as a first direction, a second direction, and a third direction, in a plan view in the third direction orthogonal to the substrate, the first movable electrode portion and the first fixed portion are disposed along the first direction, the first support beam and the second support beam are disposed along the second direction, and the first coupling portion includes a first portion disposed along the second direction side by side with the first support beam and the second support beam, and a second portion coupled to the first portion and the first movable electrode portion and disposed along the first direction.

According to the present embodiment, by forming an opening portion in a movable body including the first movable electrode portion, the first movable electrode portion serving as a mass portion can be separated by a width of the opening portion, and the sensitivity of the physical quantity sensor can be improved.

In the present embodiment, the first coupling portion may include a third portion coupled to the second portion and disposed along the second direction side by side with the first movable electrode portion.

In this way, the third portion of the first coupling portion functioning as the mass portion can be provided at a position distant from a rotation shaft including the first support beam and the second support beam, and the detection sensitivity of the physical quantity sensor can be improved.

In the present embodiment, the fixed electrode of the first fixed electrode portion and the movable electrode of the first movable electrode portion may be provided in a manner of facing each other in the second direction.

In this way, when a force is applied in the third direction, the first movable electrode portion can rotate about the second direction as a rotation axis while maintaining a state in which the fixed electrode and the movable electrode face each other in parallel. Therefore, a facing area between the fixed electrode and the movable electrode changes, and a physical quantity in the third direction can be detected.

In the present embodiment, the first movable electrode portion may include a first base movable electrode, a first movable electrode extending from the first base movable electrode in the first direction, and a second movable electrode extending from the first base movable electrode in a direction opposite the first direction, and the first fixed electrode portion may include a first fixed electrode facing the first movable electrode and a second fixed electrode facing the second movable electrode.

In this way, when a physical quantity in another axis direction changes, for example, one of a facing area between the first movable electrode and the first fixed electrode and a facing area between the second movable electrode and the second fixed electrode decreases, the other facing area increases, and deterioration of sensitivity in another axis can be prevented.

In the present embodiment, the first fixed electrode portion may include a first base fixed electrode, a first fixed electrode extending from the first base fixed electrode in the first direction, and a second fixed electrode extending from the first base fixed electrode in a direction opposite the first direction, and the first movable electrode portion may include a first movable electrode facing the first fixed electrode and a second movable electrode facing the second fixed electrode.

In this way, when a physical quantity in another axis direction changes, for example, one of a facing area between the first movable electrode and the first fixed electrode and a facing area between the second movable electrode and the second fixed electrode decreases, the other facing area increases, and the deterioration of the sensitivity in another axis can be prevented.

In the present embodiment, the at least one first fixed portion may include two fixed portions, the one end of the first support beam may be coupled to one of the two fixed portions, and the one end of the second support beam may be coupled to the other one of the two fixed portions.

In this way, a movable body including the first movable electrode portion and the first coupling portion is fixed to the substrate by the two fixed portions. Therefore, a position of a rotation shaft including the first support beam and the second support beam on the substrate can be stabilized.

The present embodiment may include: a first detection element including the first fixed electrode portion, the first movable electrode portion, the first fixed portion, the first support beam, the second support beam, and the first coupling portion; and a second detection element, and the second detection element may be disposed in a region surrounded by the first portion and the second portion of the first coupling portion.

In this way, the second detection element can be disposed using the region surrounded by the first portion and the second portion of the first coupling portion, and the physical quantity sensor can be miniaturized.

In the present embodiment, the first coupling portion may include a third portion coupled to the second portion and disposed along the second direction side by side with the first movable electrode portion, and the second detection element may be disposed in a region surrounded by the first portion, the second portion, and the third portion of the first coupling portion.

In this way, the third portion provided at a position distant from a rotation shaft including the first support beam and the second support beam functions as a mass in a rotational motion of the first movable electrode portion, and thus the detection sensitivity of the physical quantity sensor can be improved.

The present embodiment may include: a first fixed electrode wiring coupled to the first fixed electrode portion; a first movable electrode wiring coupled to the first movable electrode portion; and a first wiring group coupled to the second detection element, and the first fixed electrode wiring, the first movable electrode wiring, and the first wiring group may be wired along the second direction.

In this way, since a plurality of wiring can be wired along the second direction, pads coupled to the wiring can be collected on one side, and the physical quantity sensor can be miniaturized.

The present embodiment includes: a second fixed electrode portion provided at the substrate; a second movable electrode portion provided such that a movable electrode faces a fixed electrode of the second fixed electrode portion; at least one second fixed portion fixed to the substrate; a third support beam having one end coupled to the second fixed portion; a fourth support beam having one end coupled to the second fixed portion; and a second coupling portion coupling the other end of the third support beam and the other end of the fourth support beam to the second movable electrode portion, and in the plan view, the second fixed portion and the second movable electrode portion are disposed along the first direction, and the third support beam and the fourth support beam are disposed along the second direction. The second coupling portion includes a fourth portion disposed along the second direction side by side with the third support beam and the fourth support beam, and a fifth portion coupled to the fourth portion and the second movable electrode portion and disposed along the first direction.

In this way, by arranging the first fixed portion of a first detection element and the second fixed portion of a second detection element close to each other, even if warpage and the like of the substrate of the physical quantity sensor occurs, deterioration of accuracy of acceleration detection due to an influence of the warpage and the like can be prevented.

The present embodiment may include: a first detection element including the first fixed electrode portion, the first movable electrode portion, the first fixed portion, the first support beam, the second support beam, the first coupling portion, the second fixed electrode portion, the second movable electrode portion, the second fixed portion, the third support beam, the fourth support beam, and the second coupling portion; a second detection element; a third detection element. Further, the second detection element may be disposed in a region surrounded by the first portion and the second portion of the first coupling portion, and the third detection element may be disposed in a region surrounded by the fourth portion and the fifth portion of the second coupling portion.

In this way, the second detection element and the third detection element can be effectively provided in a dead space generated along with increase in the sensitivity of the physical quantity sensor, and a physical quantity in the first direction or the second direction can be detected together with a physical quantity in the third direction.

In the present embodiment, the first coupling portion may include a third portion coupled to the second portion and disposed along the second direction side by side with the first movable electrode portion, and the second coupling portion may include a sixth portion coupled to the fifth portion and disposed along the second direction side by side with the second movable electrode portion. Further, the second detection element may be disposed in a region surrounded by the first portion, the second portion, and the third portion of the first coupling portion 30, and the third detection element may be disposed in a region surrounded by the fourth portion, the fifth portion, and the sixth portion of the second coupling portion.

In this way, the third portion of the first coupling portion functioning as a mass portion can be provided at a position distant from a rotation shaft including the first support beam and the second support beam, and a mass of an entire movable body including the first movable electrode portion and a distance from the rotation shaft can be gained, and the detection sensitivity of the physical quantity sensor can be improved. Similarly, in the sixth portion of the second coupling portion, a mass of an entire movable body including the second movable electrode portion and a distance from the rotation shaft can be gained, and detection sensitivity of acceleration in the third direction can be improved.

The present embodiment may include: a first fixed electrode wiring coupled to the first fixed electrode portion; a first movable electrode wiring coupled to the first movable electrode portion; a second fixed electrode wiring coupled to the second fixed electrode portion; a second movable electrode wiring coupled to the second movable electrode portion; a first wiring group coupled to the second detection element; and a second wiring group coupled to the third detection element. Further, the first fixed electrode wiring, the first movable electrode wiring, the second fixed electrode wiring, the second movable electrode wiring, the first wiring group, and the second wiring group may be wired along the second direction.

In this way, since a plurality of wiring can be wired along the second direction, pads coupled to the wiring can be collected on one side, and the physical quantity sensor can be miniaturized.

The present embodiment relates to an inertial measurement unit including a control unit configured to perform control based on a detection signal output from the physical quantity sensor.

Although the present embodiment has been described in detail above, it will be easily understood by those skilled in the art that many modifications can be made without substantially departing from the novel matters and effects of the present disclosure. Therefore, all such modifications are intended to be included within the scope of the present disclosure. For example, a term cited with a different term having a broader meaning or the same meaning at least once in the specification or in the drawings can be replaced with the different term in any place in the specification or in the drawings. All combinations of the present embodiment and the modifications are also included within the scope of the present disclosure. The configurations, operations, and the like of the physical quantity sensor and the inertial measurement unit are not limited to those described in the present embodiment, and various modifications can be made.

What is claimed is:

1. A physical quantity sensor comprising:
three directions orthogonal to one another being defined as a first direction, a second direction, and a third direction;
a substrate that is quadrangular-shaped, the substrate having first, second, third, and fourth sides, the first and third sides facing each other, the second and fourth sides facing each other;
a first fixed electrode portion provided at a substrate, the first fixed electrode portion extending along the second direction, the first fixed electrode portion being fixed to the substrate via an electrode fixed portion, the electrode fixed portion being an end of the first fixed electrode portion;
a movable body, the movable body being fixed to the substrate via a first body fixed portion, the movable body being configured with:
 a first movable electrode portion provided such that a movable electrode of the first movable electrode portion faces a fixed electrode of the first fixed electrode portion;
 a first support beam having one end coupled to the first body fixed portion;
 a second support beam having one end coupled to the first body fixed portion; and
 a first coupling portion coupling the other end of the first support beam and the other end of the second support beam to the first movable electrode portion, wherein
when viewed in the third direction orthogonal to the substrate, the first movable electrode portion and the first body fixed portion are arranged along the first direction,
the first support beam and the second support beam extend along the second direction,
the first coupling portion includes:
 a first portion disposed along the second direction side by side with the first support beam and the second support beam; and
 a second portion coupled to the first portion and the first movable electrode portion and disposed along the first direction,
an end part of the first fixed electrode portion having the electrode fixed portion extends toward the first side of the substrate along the second direction from any part of the movable body,
the end part of the first fixed electrode portion is located closer to the first side of the substrate than the any part of the movable body,
the first body fixed portion is located directly adjacent to the third side of the substrate without any structure intervening between the first body fixed portion and the third side of the substrate,
when the movable body moves in the third direction or in a direction opposite to the third direction with respect to the substrate, the first movable electrode portion and the first fixed electrode portion detect a physical quantity,
the first movable electrode portion includes a first base movable electrode, a first movable electrode extending from the first base movable electrode in the first direction, and a second movable electrode extending from the first base movable electrode in a direction opposite the first direction, and
the first fixed electrode portion includes a first fixed electrode facing the first movable electrode and a second fixed electrode facing the second movable electrode.

2. The physical quantity sensor according to claim 1, wherein
the first coupling portion includes a third portion coupled to the second portion and disposed along the second direction side by side with the first movable electrode portion.

3. The physical quantity sensor according to claim 1, wherein
the fixed electrode of the first fixed electrode portion and the movable electrode of the first movable electrode portion face each other in the second direction.

4. The physical quantity sensor according to claim 1, wherein the fixed electrode of the first fixed electrode portion includes a first base fixed electrode, the first fixed electrode extending from the first base fixed electrode in the first direction, and the second fixed electrode extending from the first base fixed electrode in a direction opposite the first direction, and
the movable electrode of the first movable electrode portion includes the first movable electrode facing the first fixed electrode and the second movable electrode facing the second fixed electrode.

5. The physical quantity sensor according to claim 1, wherein
the first body fixed portion includes two body fixed portions, the one end of the first support beam is coupled to one of the two body fixed portions, and the one end of the second support beam is coupled to the other of the two body fixed portions.

6. The physical quantity sensor according to claim 1, further comprising:
a first detection element including the first fixed electrode portion, the first movable electrode portion, the first body fixed portion, the first support beam, the second support beam, and the first coupling portion; and
a second detection element, wherein
the second detection element is disposed in a region surrounded by the first portion and the second portion of the first coupling portion.

7. The physical quantity sensor according to claim 6, wherein
the first coupling portion includes a third portion coupled to the second portion and disposed along the second direction side by side with the first movable electrode portion, and
the second detection element is disposed in a region surrounded by the first portion, the second portion, and the third portion of the first coupling portion.

8. The physical quantity sensor according to claim 6, further comprising:
a first fixed electrode wiring coupled to the first fixed electrode portion;
a first movable electrode wiring coupled to the first movable electrode portion; and
a first wiring group coupled to the second detection element, wherein
the first fixed electrode wiring, the first movable electrode wiring, and the first wiring group are wired along the second direction.

9. The physical quantity sensor according to claim 1, further comprising:
a second fixed electrode portion provided at the substrate;
a second movable electrode portion provided such that a movable electrode of the second movable electrode portion faces a fixed electrode of the second fixed electrode portion;
a second body fixed portion fixed to the substrate;
a third support beam having one end coupled to the second body fixed portion;
a fourth support beam having one end coupled to the second body fixed portion; and
a second coupling portion coupling the other end of the third support beam and the other end of the fourth support beam to the second movable electrode portion, wherein
when viewed in the third direction, the second body fixed portion and the second movable electrode portion are disposed along the first direction,
the third support beam and the fourth support beam are disposed along the second direction, and
the second coupling portion includes
a fourth portion disposed along the second direction side by side with the third support beam and the fourth support beam, and
a fifth portion coupled to the fourth portion and the second movable electrode portion and disposed along the first direction.

10. The physical quantity sensor according to claim 9, further comprising:
a first detection element including the first fixed electrode portion, the first movable electrode portion, the first body fixed portion, the first support beam, the second support beam, the first coupling portion, the second fixed electrode portion, the second movable electrode portion, the second body fixed portion, the third support beam, the fourth support beam, and the second coupling portion;
a second detection element; and
a third detection element, wherein
the second detection element is disposed in a region surrounded by the first portion and the second portion of the first coupling portion, and
the third detection element is disposed in a region surrounded by the fourth portion and the fifth portion of the second coupling portion.

11. The physical quantity sensor according to claim 10, wherein
the first coupling portion includes a third portion coupled to the second portion and disposed along the second direction side by side with the first movable electrode portion,
the second coupling portion includes a sixth portion coupled to the fifth portion and disposed along the second direction side by side with the second movable electrode portion,
the second detection element is disposed in a region surrounded by the first portion, the second portion, and the third portion of the first coupling portion, and
the third detection element is disposed in a region surrounded by the fourth portion, the fifth portion, and the sixth portion of the second coupling portion.

12. The physical quantity sensor according to claim 10, further comprising:
a first fixed electrode wiring coupled to the first fixed electrode portion;
a first movable electrode wiring coupled to the first movable electrode portion;
a second fixed electrode wiring coupled to the second fixed electrode portion;
a second movable electrode wiring coupled to the second movable electrode portion;
a first wiring group coupled to the second detection element; and a second wiring group coupled to the third detection element, wherein
the first fixed electrode wiring, the first movable electrode wiring, the second fixed electrode wiring, the second movable electrode wiring, the first wiring group, and the second wiring group are wired along the second direction.

13. An inertial measurement device comprising:
the physical quantity sensor according to claim 1; and
a controller configured to control the inertial measurement device based on a detection signal output from the physical quantity sensor.

\* \* \* \* \*